United States Patent
Horvath et al.

(10) Patent No.: US 12,244,872 B2
(45) Date of Patent: Mar. 4, 2025

(54) WRAPPED RESHAPING FOR CODEWORD AUGMENTATION WITH NEIGHBORHOOD CONSISTENCY

(71) Applicant: Dolby Laboratories Licensing Corporation, San Francisco, CA (US)

(72) Inventors: Janos Horvath, Santa Clara, CA (US); Harshad Kadu, Santa Clara, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 77 days.

(21) Appl. No.: 18/252,357

(22) PCT Filed: Nov. 10, 2021

(86) PCT No.: PCT/US2021/058868
§ 371 (c)(1),
(2) Date: May 9, 2023

(87) PCT Pub. No.: WO2022/103902
PCT Pub. Date: May 19, 2022

(65) Prior Publication Data
US 2024/0007682 A1    Jan. 4, 2024

Related U.S. Application Data

(60) Provisional application No. 63/112,336, filed on Nov. 11, 2020.

(30) Foreign Application Priority Data

Nov. 11, 2020  (EP) ..................... 20206922

(51) Int. Cl.
   *H04N 19/98*   (2014.01)
   *H04N 19/105*  (2014.01)
   *H04N 19/186*  (2014.01)

(52) U.S. Cl.
   CPC .......... *H04N 19/98* (2014.11); *H04N 19/105* (2014.11); *H04N 19/186* (2014.11)

(58) Field of Classification Search
   CPC ..... H04N 19/98; H04N 19/105; H04N 19/186
   (Continued)

(56) References Cited

U.S. PATENT DOCUMENTS

| 8,811,490 B2 | 8/2014 | Su |
| 2018/0020224 A1 * | 1/2018 | Su ........................ H04N 19/192 |

(Continued)

FOREIGN PATENT DOCUMENTS

| EP | 3506208 A1 * | 7/2019 |
| WO | 2019217751 A1 | 11/2019 |
| WO | 2021216767 A1 | 10/2021 |

OTHER PUBLICATIONS

Dolby "What Is ICtCp—Introduction?", White Paper, 2016. (Year: 2016).*

(Continued)

*Primary Examiner* — Nguyen T Truong

(57) ABSTRACT

An input image of a first bit depth in an input domain is received. Forward reshaping operations are performed on the input image to generate a forward reshaped image of a second bit depth in a reshaping domain. An image container containing image data derived from the forward reshaped image is encoded into an output video signal of the second bit depth.

24 Claims, 22 Drawing Sheets

(58) Field of Classification Search
USPC .................................................... 375/240.24
See application file for complete search history.

(56) References Cited

U.S. PATENT DOCUMENTS

| | | |
|---|---|---|
| 2018/0131938 A1* | 5/2018 | Lu ........................ H04N 19/186 |
| 2019/0222866 A1* | 7/2019 | Song ...................... H04N 19/98 |
| 2022/0408081 A1 | 12/2022 | Su |
| 2023/0164366 A1 | 5/2023 | Su |
| 2023/0300381 A1 | 9/2023 | Su |

OTHER PUBLICATIONS

ITU Rec. ITU-R BT. 1886, "Reference electro-optical transfer function for flat panel displays used in HDTV studio production," (Mar. 2011). 7 pages.

ITU-R Rec. BT.2100-1 (Jun. 2017) "Image parameter values for high dynamic range television for use in production and international programme exchange."

Nelder, J.A., et al "A Simplex Method for Function Minimization" The Computer Journal, vol. 7, No. 4, pp. 308-313, 1965.

SMPTE ST 2084:2014 "High Dynamic Range EOTF of Mastering Reference Displays". 15 pages.

* cited by examiner

COLOR CUBE VIEW

VIEW FROM ABOVE

VIEW FROM THE SIDE

VIEW FROM SIDE OF THE DONUT

VIEW FROM BEHIND OF THE DONUT

VISUAL VIEW OF THE DONUT

COLOR CUBE VIEW

VIEW FROM ABOVE

VIEW FROM THE SIDE

VIEW FROM SIDE OF THE DONUT

VIEW FROM BEHIND OF THE DONUT

VISUAL VIEW OF THE DONUT

COLOR CUBE VIEW

VIEW FROM ABOVE

VIEW FROM THE SIDE

VIEW FROM SIDE OF THE DONUT

VIEW FROM BEHIND OF THE DONUT

VISUAL VIEW OF THE DONUT

COLOR CUBE VIEW

VISUAL VIEW OF THE CYLINDER

VIEW FROM THE SIDE OF THE CYLINDER

VIEW FROM BEHIND OF THE CYLINDER

COLOR CUBE VIEW

VISUAL VIEW OF THE CYLINDER

VIEW FROM THE SIDE OF THE CYLINDER

VIEW FROM BEHIND OF THE CYLINDER

WRAPPED RESHAPING FOR CODEWORD AUGMENTATION WITH NEIGHBORHOOD CONSISTENCY

CROSS REFERENCE TO RELATED APPLICATIONS

This application is a US National Stage application under U.S.C. 371 of International Application No. PCT/US2021/058868, filed on Nov. 10, 2021, which claims priority to U.S. Provisional Application No. 63/112,336, filed Nov. 11, 2020, and European Patent Application No. 20206922.5, filed Nov. 11, 2020, all of which are incorporated herein by reference in their entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, "Image parameter values for high dynamic range television for use in production and international programme exchange," (June 2017). As appreciated by the inventors here, improved techniques for coding high quality video content data that can be rendered with a wide variety of display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
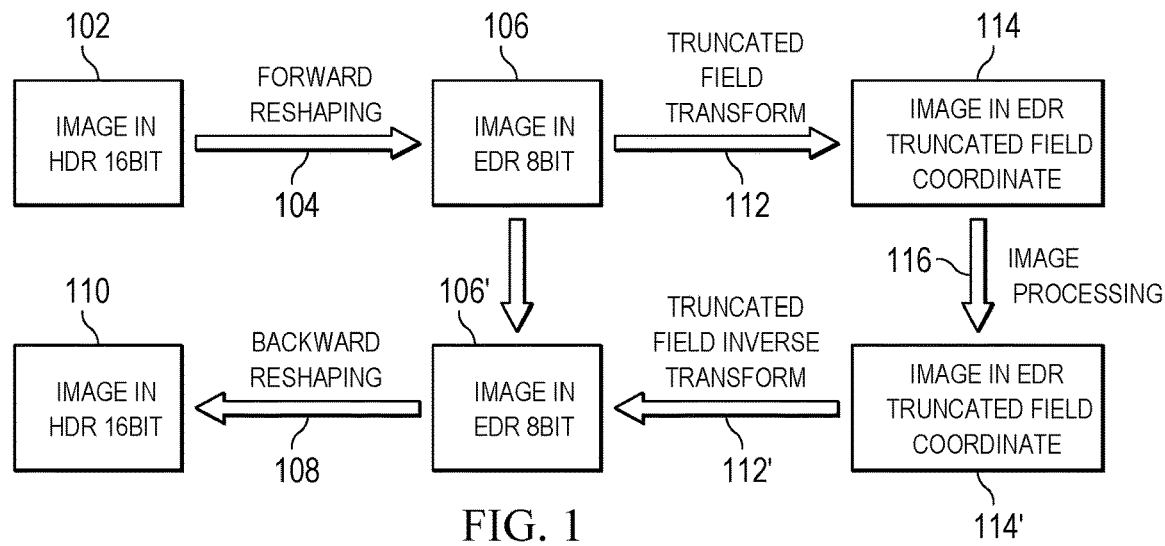
FIG. 1 illustrates an example image processing pipeline for performing wrapped reshaping operations.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

Techniques as described herein can be implemented to wrap a perceptual sensitive channel among multiple color space channels used to represent video data into a geometric or topological shape such as a circle-like or torus-like shape for the purpose of augmenting or increasing a total effective number of codewords for the perceptual sensitive channel. In some operational scenarios, the wrapping of the perceptual sensitive (or dominant) channel can be modeled with Tensor-Product B-Spline (TPB), which provides relatively high flexibility in representing or approximating mappings/functions for forward reshaping and backward reshaping.

Example reshaping operations are described in U.S. Provisional Patent Application Ser. No. 62/136,402, filed on Mar. 20, 2015, (also published on Jan. 18, 2018, as U.S. Patent Application Publication Ser. No. 2018/0020224), and PCT Application Ser. No. PCT/US2019/031620, filed on May 9, 2019, the entire contents of which are hereby incorporated by reference as if fully set forth herein. Example building of constructions of forward and backward reshaping functions are described in U.S. Provisional Patent Application Ser. No. 63/013,063, "Reshaping functions for HDR imaging with continuity and reversibility constraints," by G-M. Su, filed on Apr. 21, 2020, and U.S. Provisional Patent Application Ser. No. 63/013,807 "Iterative optimization of reshaping functions in single-layer HDR image codec," by G-M. Su and H. Kadu, filed on Apr. 22, 2020, as well as in PCT/US2021/028475, filed on 21 Apr. 2021, the contents of which are entirely incorporated herein by reference as if fully set forth herein.

Under some approaches, high dynamic range (HDR) or wide color gamut (WCG) video signals typically use a relatively high number of bits per channel—e.g., no less than 12-bits per channel, etc. —to support encoding rich colors and wide range brightness levels represented in HDR or WCG video content.

However, many end-user video devices may be equipped with popular video compression codecs only capable of encoding/decoding video signals of relatively low number of bits per channels such as 8 or 10-bit video signals. As used herein, "bits per channel" for a color channel may be referred to as "bit depth" for the color channel.

In order to enable a wide or ubiquitous distribution of HDR video content over this infrastructure of limited bit depth codecs, the HDR video content may be mapped to bit depths actually supported by these codecs through forward reshaping operations. For example, input or source video content in an input 16-bit HDR video signal can be mapped—or forward reshaped—by a video encoder to an output or reshaped 8-bit video signal for transmission to recipient devices such as end-user video devices of 8-bit codecs. A recipient device of the reshaped 8-bit video signal can convert back—or backward reshape—reshaped video content in the received reshaped 8-bit video signal to generate or reconstructed 16-bit HDR video content for display. The reconstructed 16-bit HDR video content generated by the recipient device can be rendered on a display deice to approximate the input or source 16-bit HDR video content that has been forward reshaped into the 8-bit video signal by the video encoder.

Under some approaches, simple bit-depth truncation is performed to forward reshape the input or source 16-bit HDR video content, details in the source HDR video content may be irreversibly lost after conversion or forward reshaping to the reshaped 8-bit video signal. Thus, the reconstructed HDR video content generated from the reshaped 8-bit video signal with such truncation under these approaches may be prone to show banding or contouring artifacts.

Under some other approaches, input or source codewords represented in a higher bit depth video signal may be converted or forward reshaped to reshaped codewords in a reshaped lower bit depth video signal through three-dimensional lookup table (3D-LUT) mapping. Any valid color value from a high bit depth domain or color space to a low bit depth domain or color space may be supported so long as there is still room to fill up in the entire low bit depth domain or color space (e.g., a color tube, etc.).

The 3D-LUT mapping through codeword interleaving or exploitation of sparse codeword arrangement, while packing or squeezing codewords more efficiently in the lower bit depth domain or color space, could result in assigning neighboring colors in the high bit depth domain or color space to completely different locations in the low bit depth domain or color space. As a result, color distortions and visual artifacts may be generated, especially in operational scenarios in which image processing such as subsampling or filtering is applied in the low bit depth reshaping domain. This is due to a non-local effect brought forth by the image processing that create some new codeword values in the low bit depth reshaping domain not corresponding to neighboring codewords in the original high bit depth domain or color space.

In sharp contrast, techniques as described herein can be implemented to augment availability of codewords in a low bit depth domain (or color space), while maintaining neighborhood consistency between the higher bit depth domain (or color space) and the lower bit depth domain (or color space), thereby avoiding or reducing banding artifacts as well as color distortions in reshaped video content that would be generated under other approaches. Additionally, optionally or alternatively, mapping processes such as forward reshaping and/or backward reshaping with wrapping operations as described herein may be implemented with closed-form equations or solutions, thereby enhancing reversibility and image quality in reconstructed video.

Some or all operations as described herein may be implemented with an off-loop training phase, an in-loop prediction phase, or a combination of the two phases. In some operational scenarios, in a training phase, target (reshaping) objects/forms may be designed, derived or generated with different operational parameters using training data. Later in a deployment or prediction phase, a specific target object/form can be selected from these target objects/forms for an input or source higher bit depth video signal or for an input or source image therein. The specific selected target object/form can be applied in a wrapping process to wrap or reshape the input or source higher bit depth video signal or the input or source image into a lower bit depth video signal or a reshaped image therein represented in a reshaping domain or color space.

In some operational scenarios, the wrapping process can be modeled as image processing operations that apply forward and backward reshaping functions/mappings using TPB based functions/mappings.

Optimized values for some or all TPB coefficients specifying or defining the TPB based functions/mappings used in the wrapping process can be obtained or preconfigured via an iterative algorithm/method/process to minimize prediction errors and/or enhance prediction qualities using the training data. As a result, a set of forward and backward reshaping functions can be obtained or stored in a reshaping function data store in the training phase and can be looked up later in the deployment or prediction phase.

In the deployment or prediction phase, given an input image, (1) optimized pre-reshaping operations such as applying scaling/offset on the predefined or stored reshaping functions may be performed to enhance reshaping operation accuracy, and (2) optimized selection operations such as selecting a specific reshaping function from the reshaping function data store for the input image may be performed to minimize prediction errors.

In the deployment or prediction phase, image processing operations may be safely performed on reshaped video data in the reshaping domain in which a reshaped signal is wrapped around. New codewords created during the image processing process can be (e.g., specially, appropriately, etc.) treated when performing the image processing operations in the reshaping domain.

Techniques as described herein are not limited to operational scenarios in which AVC 8-bit compression is used to reshape video signals. Some or all of these techniques can be used to compress high bit depth video signal of one of a variety of different relatively high numbers of bits such as 12 bits, 16 bits, etc., to a reshaped video signal of a lower number of bits such as 8 bits, 10 bits, 12 bits, etc., through wrapping a perceptible important or dominate channel/axis into a 3D space represented in the low bit depth reshape domain or color space. Available codewords used to encode or represent the perceptible important or dominate channel/axis in the reshaped signal can increase as much as 2 or 4 times available codewords under other approaches, and even more through adaptive pre-scaling.

In some operational scenarios, reshaped video content—which may be 8 bits, 10 bits, 12 bits, etc., per channel—generated under techniques as described herein can be stored in a baseband signal container for storage or transmitted in a baseband signal used in conjunction with a SDI or HDMI cable.

Example embodiments described herein relate to encoding video images. An input image of a first bit depth in an input domain is received from an input video signal of the first bit depth. The first bit depth is higher than a second bit depth in a reshaping domain. Forward reshaping operations are performed on the input image to generate a forward reshaped image of the second bit depth in the reshaping domain. The forward reshaping operations include wrapping input codewords in the input image along a non-wrapped axis of the input domain into reshaped codewords in the forward reshaped image in a wrapped axis of the reshaping domain. An image container containing image data derived from the forward reshaped image is encoded into an output video signal of the second bit depth. The image data in the image container causes a recipient device of the output video signal to construct a backward reshaped image of a third bit depth for rendering on a display device. The third bit depth is higher than the second bit depth.

Example embodiments described herein relate to decoding video images. An image container containing image data derived from a forward reshaped image in a reshaping domain is decoded from a video signal. A source image of a first bit depth in a source domain has been forward reshaped to generate the forward reshaped image in a second bit depth lower than the first bit depth. Backward reshaping operations are applied on the image data decoded from the video signal to generate a backward reshaped image in a target domain. The backward reshaped image is of a third bit depth higher than the second bit depth, the backward reshaping operations including unwrapping codewords in the image data along a wrapped axis of the reshaping domain into backward reshaped codewords in the backward reshaped image in a non-wrapped axis of the target domain. A display image generated from the backward reshaped image is rendered on a display device.

Example Image Processing Pipeline

FIG. 1 illustrates an example image processing pipeline for performing wrapped reshaping operations. Some or all coding and/or decoding operations in the image processing pipeline may be performed by one or more computing devices with audio and video codecs, such as those defined by ATSC, DVB, DVD, Blu-Ray, and other standards/specifications. The image processing pipeline may be implemented on the decoder side only, on the encoder side only, or a combination of the encoder and decoder sides.

An input or source HDR image 102 of a high bit depth (e.g., 12 bits, 16 bits, etc.) per channel in an input or source domain or color space may be received by way of an input or source high bit depth video signal. A reconstructed HDR image 110 of a high bit depth per channel in an output or target domain or color space may be generated at the end of the image processing pipeline. The reconstructed HDR image (110) may, but is not necessarily limited to only to, be of the same high bit depth as the input or source HDR image (102).

In some operational scenarios, the input or source HDR image (102) may be any image in a sequence of consecutive input or source HDR images that are received and processed with the image processing pipeline. Some or all of the consecutive input or source HDR images can be generated from analog or digitally captured images or computer generated images through (e.g., automatic with no human input, manual, automatic with human input, etc.) video editing or transformation operations, color grading operations, etc. The consecutive input or source HDR images may be images relating to one or more of: movie releases, archived media programs, media program libraries, video recordings/clips, media programs, TV programs, user-generated video contents, etc.

The output or target HDR image (110) of FIG. 1 may be a corresponding reconstructed image in a sequence of corresponding consecutive output or target HDR images that are generated from the image processing pipeline. The consecutive output or target HDR images depict the same visual semantic content as that depicted in the consecutive input or source HDR images. Display images can be directly or indirectly—e.g., through additional display management operations, etc. —derived from the consecutive output or target HDR images and rendered on an HDR display. Example HDR displays may include, but are not limited to, image displays operating in conjunction with TVs, mobile devices, home theaters, etc.

As shown in FIG. 1, the input or source HDR image (102) may be converted to a forward reshaped EDR image 106 of a low bit depth (e.g., 8 bits, 10 bits, 12 bits, etc.) per channel in a reshaping domain or color space by wrapped forward reshaping operations 104. In some operational scenarios, the forward reshaped EDR image (106) in the reshaping domain or color space may be contained or encapsulated in an 8-bit image container, for example supported by a wide variety of video codecs.

The wrapped forward reshaping operations (104) may be specifically selected or designed to generate the forward reshaped EDR image (106) so that minimal or least distortions are introduced into the reconstructed or backward reshaped HDR image (110) in the output or target domain or color space.

The reconstructed or backward reshaped HDR image (110) can be generated by wrapped backward reshaping 108 from a decoded EDR image 106' of the low bit depth per channel in the reshaping domain or color space. The distortions introduced by the wrapped forward and backward reshaping operations (104 and 108) in the reconstructed or backward reshaped HDR image (110) may be estimated or measured in reference to the input or source HDR image (102).

In some operational scenarios, the decoded EDR image (106') may be the same as the forward reshaped EDR image (106), subject to quantization and/or coding errors in encoding the forward reshaped EDR image (106) into a low bit depth reshaped video signal and decoding the decoded EDR image (106') from the low bit depth reshaped video signal.

In some operational scenarios, the forward reshaped EDR image (106) is transformed by a truncated field transform 112 into a truncated forward reshaped EDR image 114 of the low bit depth per channel in a truncated reshaping domain or a new transform domain (e.g., in floating precision, etc.). The truncated forward reshaped EDR image (114) in the truncated reshaping domain is applied with one or more image processing operations 116 to generate a processed truncated forward reshaped EDR image 114' of the low bit depth per channel in the truncated reshaping domain.

Example image processing operations may include, but are not necessarily limited to only, one or more of: incorporation of neighborhood information, linear or non-linear combination of neighborhood information, upsampling, downsampling, deblocking, low pass filtering, and so forth. The processed truncated forward reshaped EDR image (114') is inverse transformed by an inverse truncated field transform 112' into a processed forward reshaped EDR image of the low bit depth per channel in the reshaping domain from the truncated reshaping domain or new transform domain (in floating precision).

The truncated field transform (112), inverse truncate field transform (112') and the image processing operations (114) may be performed either on the encoder side or the decoder side. By way of example but not limitation, these operations may be performed on the encoder side.

The processed forward reshaped EDR image of the low bit depth per channel in the reshaping domain may be encoded into a reshaped video signal of the low bit depth. The decoded EDR image (106') may be the same as the processed forward reshaped EDR image of the low bit depth per channel in the reshaping domain, subject to quantization and/or coding errors in encoding the processed forward reshaped EDR image of the low bit depth per channel in the reshaping domain into the low bit depth reshaped video signal and decoding the decoded EDR image (106') from the low bit depth reshaped video signal.

To pack or squeeze codewords in the high bit depth HDR image (102) into the 8-bit image container, the wrapped forward reshaping operations (104) may be carried out in many different ways with a variety of forward reshaping mappings or functions.

By way of example but not limitation, the wrapped forward reshaping operations (104) implements a two-stage reshaping. The first stage—which may be referred to as secondary reshaping—comprises per-channel pre-reshaping or scaling, which may linearly scale a limited input data range to a full data range for each color channel of the input video data in the high bit depth HDR image (102). The second stage—which may be referred to as primary reshaping—comprises cross-color channel non-linear forward reshaping using TPB-based forward reshaping functions.

Likewise, the wrapped backward reshaping operations (108) comprises (1) applying cross-color channel non-linear backward reshaping using TPB-based backward reshaping functions and (2) applying per-channel post-reshaping or inverse scaling, which may inversely scale the full data range to the limited input data range for each color channel of the reconstructed video data in the reconstructed HDR image (110).

The truncated field transform (112) and the inverse truncated field transform (112') are applied to ensure codewords in the processed forward reshaped EDR image produced from the image processing operations (114) and the transforms (112 and 112') stay in a designated codeword value range such that no codewords are outside a designed form or shape in the 8-bit wrapped reshaping domain or color space. Without these transforms (112 and 112'), codewords generated by the image processing operations (114) may become out-of-range and lie outside the designed form or shape in the 8-bit wrapped reshaping domain or color space, thereby ultimately generating visible color artifacts in the reconstructed HDR image (110).

Primary Reshaping in Training Phase

Reshaping operations can be applied in different ways in various operational scenarios. In some operational scenarios, fully dynamic reshaping may be applied. In these scenarios, a reshaping function can be built to perform end-to-end reshaping between an original (e.g., input, source, etc.) domain to a reshaped (e.g., output, target, etc.) domain. This function may be theoretically selected for specific video content in light of the fact that video contents can have different specific color distributions. This full dynamic reshaping approach may entail relatively high computational complexities and costs, as an end-to-end optimization process to derive optimized operational parameters of the reshaping function would need to be performed with computationally complex and cost intensive algorithms. In addition, numerical instability is likely to show up under this approach to cause slow or no convergence in reaching an optimized or converging solution.

In some operational scenarios, two-stage reshaping may be applied to alleviate issues relating to computational complexities and costs and to numeric stability. An end-to-end reshaping process under this approach comprises primary reshaping and secondary reshaping.

Primary reshaping or the second stage involves relatively heavy computation and can be performed or trained offline or as off-loop operations. Secondary reshaping or the first stage is comparatively lightweight and can be performed online or as in-loop operations.

As used herein, off-loop operations may refer to operations that are not performed as a part of realtime image encoding/decoding operations at runtime but rather that are performed in offline training process. In-loop operations may refer to operations that are performed as a part of realtime image encoding/decoding operations or an online deployment process at runtime.

To help provide the lightest or least complex computations in the (online) deployment phase, some or all of computationally intensive tasks of obtaining trained operational coefficients for reshaping and store the trained operational coefficients in a reshaping coefficient data store can be performed offline in primary reshaping or the second stage.

Lighter refinement operations can be performed for a received input image such as 102 of FIG. 1 in secondary reshaping or the first stage during the deployment phase.

In the training phase, primary reshaping functions such as TPB based forward and backward reshaping functions can be trained with training data or training images therein before processing input images. In some operational scenarios, the training phase may be divided or partitioned into two parts: (1) reference mapping creation, and (2) TPB training.

The reference mapping creation involve two control variable sets. The first of the two control variable sets relates to a selection of a reference mapping object, shape or form among different reference mapping objects, shapes or forms supported in a wrapped reshaping domain.

The second of the above-mentioned two control variable sets relates to geometric parameters for a given reference mapping object, shape or form. The geometric parameters determine width, height, and other attributes for the given reference mapping object, shape or form.

A reference mapping shape or form as described herein refers to a geometric or topological object, shape or form in the wrapped reshaping domain. Example geometric or topological object, shape or form that can be used as reference mapping object, shapes or forms as described herein include, but are not necessarily limited to only, any of: a donut object/shape/form, a torus object/shape/form, a cylinder shape/form, a helical object/shape/form, a spiral object/ shape/form, and so forth.

Figure 2A:
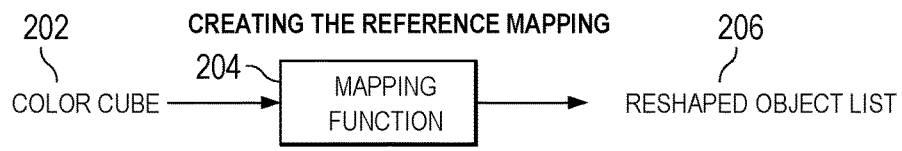
FIG. 2A illustrates example mapping of an input domain into a reshaping domain of a reference shape.

As illustrated in FIG. 2A, codewords in an HDR image—which may be a training HDR image in the training phase or an input or source HDR image such as 102 of FIG. 1 in the deployment prediction phase—may be represented or distributed in a color cube 202. A mapping function 204 based on the two control variable sets may be used to map or convert the codewords in the color cube (202) into corresponding codewords in a specific reference mapping shape/form with specific geometric parameters from among a plurality of available reference mapping shapes/forms in a reshaped object list 206. The plurality of available reference mapping shapes/forms in the reshaped object list (206) may be created, defined or designed in the training phase.

The two control variable sets influence or at least partly control quantization and dequantization during an end-to-end forward and backward reshaping process, and hence influence or at least partly control prediction accuracy or errors in the forward and backward reshaping process. Operational parameters in the two control variable sets for different reference mapping objects, shapes or forms supported in the wrapped reshaping domain or color space can be trained and stored as templates in the operational parameter datasets in the training phase. Each template may include a (e.g., distinct, etc.) combination of specific values, as generated in the training process, for the operational parameters in the two control variable sets. The combination of specific values in the template may be specifically selected or chosen among multiple combinations or sets of candidate values in the training phase to achieve the best prediction results and generate the least errors in training/testing data in the training phase.

Figure 2B:
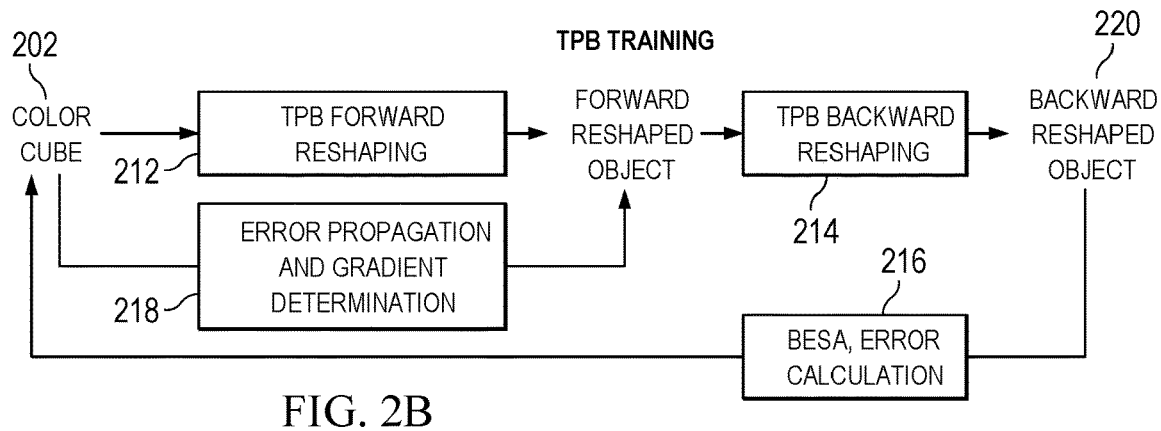
FIG. 2B illustrates an example flow for generating specific operational parameter values in primary reshaping.

In the training phase, the TPB Training can be used to generate (e.g., generic, trained, TPB-based, etc.) reshaping functions for different templates corresponding to different combinations of values for the two control variable sets. A gradient based BESA (Backward Error Subtraction for signal Adjustment) algorithm/method may be used or performed as a part of the TPB training to generate or obtain specific (e.g., optimized, trained, etc.) forward and backward reshaping coefficients that define or specify a TPB reshaping function for each template corresponding to a respective combination of values for the two control variable sets. FIG. 2B illustrates example TPB training using a gradient based BESA algorithm/method, as will be further discussed in detail later. Example BESA algorithm/method can be found in the previously mentioned U.S. Provisional Patent Application Ser. No. 63/013,807.

Secondary Reshaping and Primary Reshaping

Figure 2C:
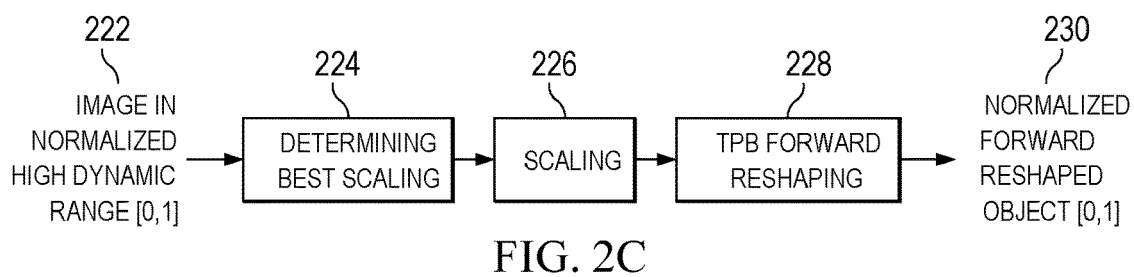
FIG. 2C illustrates an example flow for primary and secondary reshaping.

FIG. 2C illustrates an example flow for secondary reshaping and primary reshaping, which may be performed in part or in whole in a deployment or prediction phase. As shown, an input or source image 222 (denoted as "Image in Normalized High Dynamic Range") such as 102 of FIG. 1 in a high bit depth domain or color space is received in the deployment or prediction phase for wrapped reshaping into a reshaped object/shape/form or reshaped image 230 (denoted as "Image in Normalized Forward Reshaped Object") such as 106 of FIG. 1 in a low bit depth domain or color space.

In some operational scenarios, input or source codewords in the input or source image (222) are normalized in a specific codeword range such as [0, 1]. Similarly, reshaped codewords in the reshaped image (230) are normalized in a specific codeword range such as [0, 1].

In the deployment or prediction phase, an input or source HDR image may or may not have a color or codeword distribution that fully occupy the entire codeword space such as a 3D color cube in the input or source HDR domain. A pre-reshaping (or secondary reshaping) stage can be implemented or performed to help fully utilize available capacity in a codeword space in which codewords of the input or source HDR image (222) may be represented or hosted.

As illustrated in FIG. 2C, the pre-reshaping (or secondary reshaping) stage includes a block 224 in which one or more best scaling factors/values are determined in response to determining that the input or source image occupies a limited range in each of one or more channels. The pre-reshaping (or secondary reshaping) stage further includes a block 226 in which codewords in one or more limited ranges may be (e.g., linearly, non-linearly, etc.) pre-scaled or re-scaled respectively with the one or more best scaling factors/values from the one or more limited ranges to one or more full codeword ranges in the one or more channels.

In block 228, an intermediate image comprising scaled codewords generated in block 226 from scaling the input or source codewords in the input or source image (222) may be reshaped by primary reshaping based at least in part on a pre-defined or trained TPB reshaping function specifically selected for the input or source HDR image, thereby generating the reshaped image (230) in the reshaping domain or color space.

In some operational scenarios, the pre-defined or trained reshaping function for a corresponding template with a combination of specific values for the two control variable sets may be generated or obtained in the training phase assuming a full occupancy of the codeword space in the input or source HDR domain or color space. Reshaping coefficients that define or specify the pre-defined or trained reshaping function can be trained to perform reshaping or full mapping on codewords in the entire codeword space.

The reshaped image (230)—or a processed version of the reshaped image (230) generated from truncated field transform, image processing operations and/or inverse truncated field transform—can be encoded in a (reshaped) video signal. A recipient device of the video signal can decode the reshaped image (230) or the processed version thereof and perform backward reshaping and inverse/reverse scaling on the reshaped image (230) or the processed version thereof, thereby generating a reconstructed image of a high bit depth in a high bit depth output or target domain or color space.

Figure 2D:
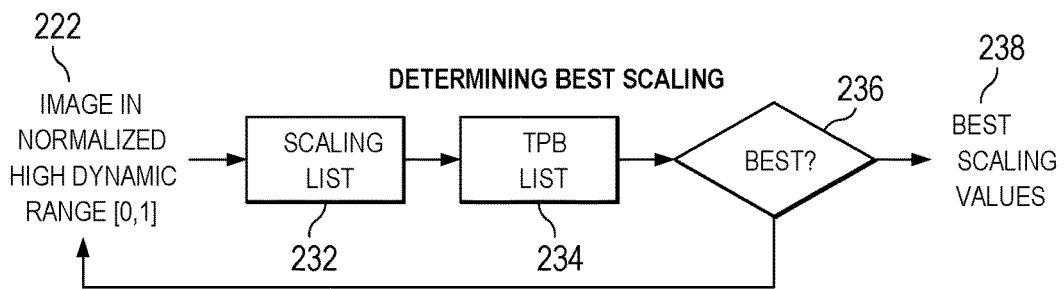
FIG. 2D through FIG. 2F illustrate example flows for determining best scaling factors.

FIG. 2D illustrates an example flow for determining best scaling factors or values 238 given an input or source image (e.g., 222 of FIG. 2C, etc.) in the deployment or prediction phase. Specific (e.g., optimized, etc.) values for operational parameters used in primary and secondary reshaping may be generated or obtained via a (best value) search 236 based on a cost function such as mean-squared error (MSE). These operational parameters may include operational parameters for primary reshaping represented in a TPB list 234. These operational parameters may further include operational parameters for secondary reshaping such as scaling factors/values represented in a scaling list 232. The specific (e.g., optimized, etc.) values or settings (238) for operational parameters in the TPB list (234) and the scaling list (232) can be generated or obtained via the search (236).

Primary Reshaping Functions

Forward and backward reshaping operations in the primary reshaping may be performed at least in part with mathematical functions and/or parametric equations. A target reshaping object/form/shape or transformations relating thereto may be expressed in math equations. A hard-coded fixed-form equation might be acceptable in some cases but not so for other cases. To help support multiple reshaping objects/forms/shapes, a reshaping function as described herein may be designed with relatively large or maximum flexibility and freedom.

In some operational scenarios, parameters, coefficients and/or their values that define or specify reshaping function (s) relating to a specific target reshaping object/form/shape may be included in a coded bitstream encoded in a video signal. A recipient device of the video signal on the decoder side can decode and use those parameters, coefficients and/or values to build or rebuild the reshaping function(s) such as backward reshaping functions without using hard-coded fixed-form equations.

By way of example but not limitation, reshaping functions as described herein can be specified using flexible mapping or functional constructs such as geometric functions/transforms, multivariate multiple regression (MMR) and tensor product B-spline (TPB) based transformation functions/mappings. Specific (e.g., optimized, etc.) values or settings for coefficients or operational parameters for MMR and TPB based reshaping functions or mappings may be generated or obtained with an iterative algorithm as will be further explained in detail later.

Examples of MMR operations are described in U.S. Pat. No. 8,811,490, which are incorporated by reference in its entirety as if fully set forth herein. Examples of TPB operations are described in U.S. Provisional Application Ser. No. 62/908,770, titled "TENSOR-PRODUCT B-SPLINE PREDICTOR," filed on Oct. 1, 2019, which are incorporated by reference in its entirety as if fully set forth herein.

A geometric transform—e.g., used to transform a shape or form such as a color cube into one of reference reshaping shapes or forms such as cylinder-like shapes or forms, donut-like shapes or forms, torus shapes or forms, etc.—may be used to transform input codewords in an input domain or color space such as those best scaled and represented in a color cube into reshaped codewords in a reference reshaping shape or form in a reshaping domain. The geometric transform may be represented with a functional expression such as a 3D geometric transformation function.

In some operational scenarios, a geometric transform as described herein may include a transformation for each dimension or channel that can be performed individually or separately via a cross-channel transformation function. Denote per-channel transformations as $f_x$, $f_y$, and $f_z$. The per-channel transformations in the geometric transform may be given as follows:

$$\hat{x} = f_x(x,y,z) \tag{1-1}$$

$$\hat{y} = f_y(x,y,z) \tag{1-2}$$

$$\hat{z} = f_z(x,y,z) \tag{1-3}$$

In some operational scenarios, a 3×3 matrix form may be used to represent the transformations or transformation functions in expressions (1) above. In these operational scenarios, the geometric transform represented by the transformations or transformation functions in expressions (1) above may be rewritten via matrix multiplication, and transforms or changes matrix—e.g., single column matrix, etc.—elements from a given point in an input domain or color space to a corresponding point in an output domain or color space, as follows:

$$\begin{bmatrix} \hat{x} \\ \hat{y} \\ \hat{z} \end{bmatrix} = \begin{bmatrix} f_{x,x}(x,y,z) & f_{x,y}(x,y,z) & f_{x,z}(x,y,z) \\ f_{y,x}(x,y,z) & f_{y,y}(x,y,z) & f_{y,z}(x,y,z) \\ f_{z,x}(x,y,z) & f_{z,y}(x,y,z) & f_{z,z}(x,y,z) \end{bmatrix} \begin{bmatrix} x \\ y \\ z \end{bmatrix} \tag{2-1}$$

or as follows using different notations:

$$\bar{\tilde{x}} = \overline{A}\bar{x} \tag{2-2}$$

where the 1×3 column on the left hand side (LHS) in expression (2-1) may represent the corresponding point in the output domain or color space and may be denoted as $\bar{\tilde{x}}$ in expression (2-2); the 1×3 column on the right hand side (RHS) in expression (2-1) may represent the given point in the input domain or color space and may be denoted as $\bar{x}$ in expression (2-2); the 3×3 matrix on the right hand side (RHS) in expression (2-1) may comprise matrix elements representing the per-channel transformations and may be denoted $\overline{A}$ as in expression (2-2).

Each element of the matrix $\overline{A}$ is not necessarily restricted to be in any particular functional form. For example, such element may or may not be a polynomial. In some operational scenarios, each element of the matrix $\overline{A}$ may be given with a closed form or formula.

An MMR transform—e.g., used to reshape input codewords—may be represented with an MMR mapping or function denoted as $f_{MMR}(\cdot)$. The MMR mapping or function may accept three input parameters ($x_0$, $x_1$, $x_2$) and generate or output a single value $\hat{y}$, as follows:

$$\hat{y} = f_{MMR}(x_0, x_1, x_2) \tag{3}$$

The MMR mapping or function can have a predefined format involving higher powers of input variables/arguments and pre-selected cross terms specified using some or all the input variables/arguments. A non-limiting example form of the MMR mapping or function may be of the second order, as follows:

$$\begin{aligned}F_{MMR}(x_0,x_1,x_2) = &m_0 + m_1 x_0 + m_2 x_1 + m_3 x_2 + m_4 x_0 x_1 + \\&m_5 x_1 x_2 + m_6 x_0 x_2 + m_7 x_0 x_1 x_2 + m_8 x_0^2 + m_9 x_1^2 + \\&m_{10} x_2^2 + m_{11} x_0^2 x_1^2 + m_{12} x_1^2 x_2^2 + m_{13} x_0^2 x_2^2 + \\&m_{14} x_0^2 x_1^2 x_2^2\end{aligned} \tag{4}$$

where $m_0 \sim m_{14}$ represent MMR coefficients to be trained or learned from training data comprising training datasets with triplets ($x_0$, $x_1$, $x_2$) and corresponding targets y.

For a three-channel input image represented in an input or source domain or color space, three predictors may be specified or learned to reshape codewords in three channels of the input or source domain or color space into reshaped codewords in three target channels of the output or target domain or color space. Each predictor in the three predictors may be used to reshape codewords in the three channels of the input or source domain or color space into reshaped codewords in a corresponding target channel in the three channels of the output or target domain or color space.

A TPB transform—e.g., used to reshape input codewords to reshaped codewords—may be represented with a TPB mapping or function denoted as $f_{TPB}(\cdot)$. The TPB mapping or function—which represents a relatively advanced and powerful function for cross channel prediction—may use B-splines as basis functions and accept three input parameters ($x_0$, $x_1$, $x_2$) and generate or output a single value $\hat{y}$, as follows:

$$\hat{y} = f_{TPB}(x_0, x_1, x_2) \tag{5}$$

The internal structure of the TPB function can be represented by the following equation with $D_0$, $D_1$ and $D_2$ basis functions along the three input channels or dimensions, as follows:

$$f_{TPB}(x_0, x_1, x_2) = \sum_{t_0=0}^{D_0} \sum_{t_1=0}^{D_1} \sum_{t_2=0}^{D_2} m_{t_0,t_1,t_2} B_{t_0,t_1,t_2}(x_0, x_1, x_2) \tag{6}$$

where $t_0$, $t_1$ and $t_2$ represent knot point indexes; $m_{t_0,t_1,t_2}$ represent TPB coefficients to be generated or learned from the training data.

The composite basis function $B_{t_0,t_1,t_2}(x_0, x_1, x_2)$ in expression (6) above may be given as a product of individual basis functions in the three channels or dimensions, as follows:

$$B_{t_0,t_1,t_2}(x_0, x_1, x_2) = B_{t_0}(x_0) \cdot B_{t_1}(x_1) \cdot B_{t_2}(x_2) \tag{7}$$

The TPB function can have far more coefficients than MMR, thereby providing additional freedom and capability to model complex mapping in image reshaping operations.

Optimized Values for Operational Parameters in Primary Reshaping

FIG. 2B illustrates an example flow for generating specific (e.g., optimized, etc.) values for operational parameters in primary reshaping. In some operational scenarios, an iterative algorithm such as a BESA algorithm may be implemented in TPB training as a part of the training phase to minimize prediction errors generated from cascading forward and backward reshaping or prediction operations performed in the primary reshaping. The cascading forward and backward reshaping or prediction operations may apply TPB or MMR forward and backward reshaping functions.

By way of example but not limitation, as illustrated in FIG. 2B, in the TPB training, given input values ($x_0$, $x_1$, $x_2$) of a training input or source image in an input/original domain or color space represented with a color cube 202, a TPB forward reshaping function 212 can be applied to obtain or generate corresponding forward reshaped values ($y_0$, $y_1$, $y_2$) of a forward reshaped image (denoted as "Forward Reshaped Object") in a reshaping domain or color space. In addition, given the corresponding forward reshaped values ($y_0$, $y_1$, $y_2$) of the forward reshaped image ("Forward Reshaped Object"), a TPB backward reshaping function 214 can be applied to obtain or generate corresponding reconstructed or backward reshaped values ($\hat{x}_0$, $\hat{x}_1$, $\hat{x}_2$) of a reconstructed or backward reshaped image in a reconstructed or output/target domain or color space. The constructed or output/target domain or color space may be the same as the input/original domain or color space.

Optimized values for operational parameters in the TPB forward and backward reshaping functions can be obtained or generated via a least squared solution to an optimization problem that minimizes differences or prediction errors between the reconstructed image generated by the forward and backward reshaping operations and the training input or source image.

In some operational scenarios, the prediction errors may be computed as as $\Delta = \alpha(x - \hat{x})$. In some other operational scenarios, the prediction errors may be computed as $\Delta = \alpha(x - \hat{x})g(x)$, where x represents a vector comprising the input values ($x_0$, $x_1$, $x_2$) from the input/original domain or color space; $\hat{x}$ represents a vector comprising the reconstructed values ($\hat{x}_0$, $\hat{x}_1$, $\hat{x}_2$) in the input/original domain or color space; g(x) represents spatial gradients (e.g., 3×3 matrix, etc.) of the forward reshaping function at the point represented by x, as will be further discussed in detail later. The spatial gradients g(x) is added to make the iterative algorithm converge faster than without the spatial gradients, as the addition of the spatial gradients in the prediction errors help update or speed up changes in the reshaped values in successive iterations.

As illustrated in FIG. 2B, the iterative algorithm may include, for each iteration, propagating the computed prediction errors in block 218 (denoted as "Error propagation+ gradient determination") to the reshaped values in the reshaping domain or color space. For example, the predictions error can be subtracted from the reshaped values as $(y_0-\Delta_0, y_1-\Delta_1, y_2-\Delta_2)$. The updated reshaped values $(y_0-\Delta_0, y_1-\Delta_1, y_2-\Delta_2)$ are then used as input for the next iteration—or the next performance of block 218 ("error propagation+gradient determination")—in the TPB training of the training phase.

More specifically, in each iteration, updated reshaped values $(y_0-\Delta_0, y_1-\Delta_1, y_2-\Delta_2)$ can remain unchanged and serve as target values for optimizing operational parameters for the TPB forward reshaping function (212). In the meantime, the input/original values $(x_0, x_1, x_2)$ can continue to serve as target values for optimizing the overall operational parameters for the TPB forward and backward reshaping function (212 and 214).

The foregoing operations may be iterated until the optimized values for the operational parameters (or TPB coefficients) for the TPB forward and backward reshaping function (212 and 214) converge such as until an overall value change measure between two successive iterations is less than a minimum value change threshold.

In some operational scenarios, MMR reshaping functions may be used for forward and backward reshaping operations as described herein. In these operational scenarios, optimized values for operational parameters (or MMR coefficients) for MMR forward and backward reshaping mappings/functions may be generated or obtained, similar to how the optimized values for the operational parameters (or TPB coefficients) for the TPB forward and backward reshaping mappings/functions as illustrated in FIG. 2B.

In the training phase, one or more reference mappings corresponding to one or more respective forward reshaping functions can be specified or defined with optimized values for operational parameters such as control variable sets and/or TPB parameters/coefficients and/or MMR parameters/coefficients used by these forward reshaping functions. Some or all of the optimized values for the operational parameters can be generated or obtained, for example, through an iterative algorithm as illustrated in FIG. 2B.

Each reference mapping in the one or more reference mappings maps codewords of an input image distributed in an input domain or color space such as a color cube to codewords distributed in a reshaped object or form such as a cylinder shaped object.

Unnormalized spatial gradients—denoted as $\tilde{g}(x, y, z)$—may be computed by taking derivatives of the reference mapping (or forward reshaping function) at each point represented by input values $(x, y, z)$ in (e.g., three, etc.) channels/dimensions of the input domain or color space, as follows:

$$\tilde{g}(x,y,z)=[g_x(x,y,z),g_y(x,y,z),g_z(x,y,z)] \quad (8)$$

These spatial gradients can be normalized in each channel/dimension as follows:

$$g(x, y, z) = \frac{\tilde{g}(x, y, z)}{\|\tilde{g}(x, y, z)\|} \text{ for each dimension} \quad (9)$$

The normalized spatial gradients constitute a Jacobi Matrix (denoted as $D\overline{A}$ or $J_{\overline{A}}$) for the reference mapping (or forward reshaping function), as follows:

$$D\overline{A} = J_{\overline{A}} = \Delta\overline{A} = \begin{bmatrix} \frac{\partial f}{\partial x} & \frac{\partial f}{\partial y} & \frac{\partial f}{\partial z} \end{bmatrix} \quad (10)$$

where $f$ represents a transformation functional form for the reference mapping (or forward reshaping function) such as the per-channel transformation mapping—with $f_x$, $f_y$ and $f_z$ as vector/matrix components off—in expressions (1), the MMR mapping/function in expression (3) or the TPB mapping/function in expression (5);

$$\frac{\partial}{\partial x}, \frac{\partial}{\partial y}, \frac{\partial}{\partial z}$$

denote partial derivatives or differences with respect to color channels x, y, z.

The normalized spatial gradients may be rewritten in a functional form using vectors and the Jacobi Matrix, as follows:

$$g(\bar{x})=(D\overline{A})\bar{x} \quad (11)$$

In some operational scenarios, the spatial gradients of the reference mapping (or forward reshaping function) can be computed or generated numerically. For each point—as represented by forward reshaped values generated from a corresponding point represented by corresponding input values in the input/original domain or color space—in the reshaping domain or color space, (e.g., nearest, etc.) neighbors or neighboring points can be identified and used to compute one or more distances or distance vectors in each dimension/channel between the point and the neighbors. A distance vector as described herein may be normalized to one (1).

In operational scenarios in which spatial gradients are not used in computing prediction errors between a reconstructed image and an input image giving rise to the reconstructed with forward and backward reshaping, prediction errors in both forward reshaping and backward reshaping may diverge or may converge relatively slowly.

Figure 3A:
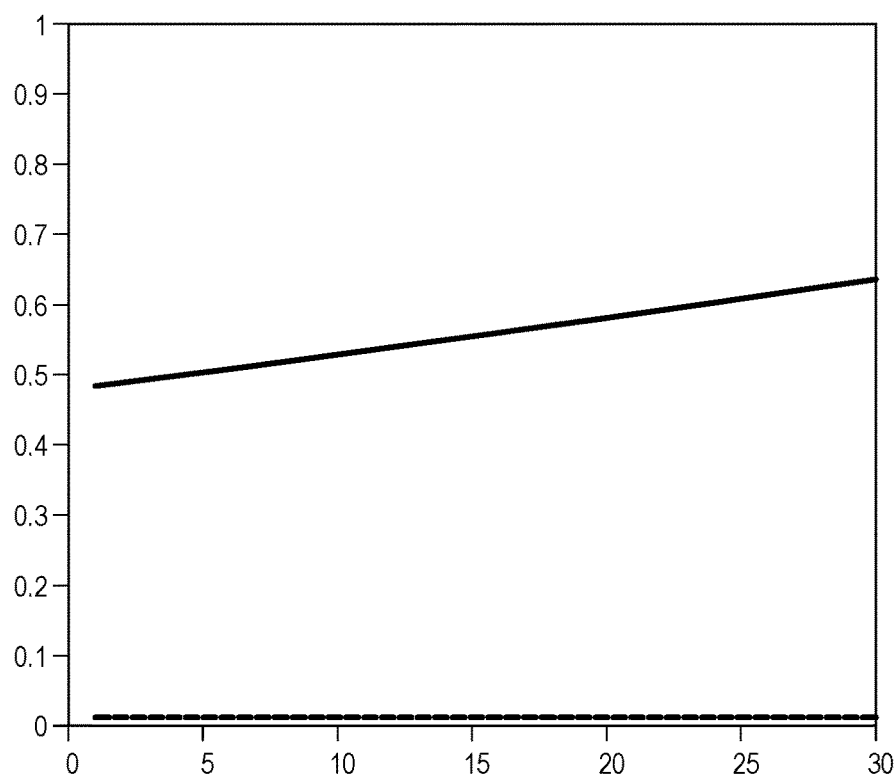
FIG. 3A illustrates prediction errors in forward reshaping.
Figure 3B:
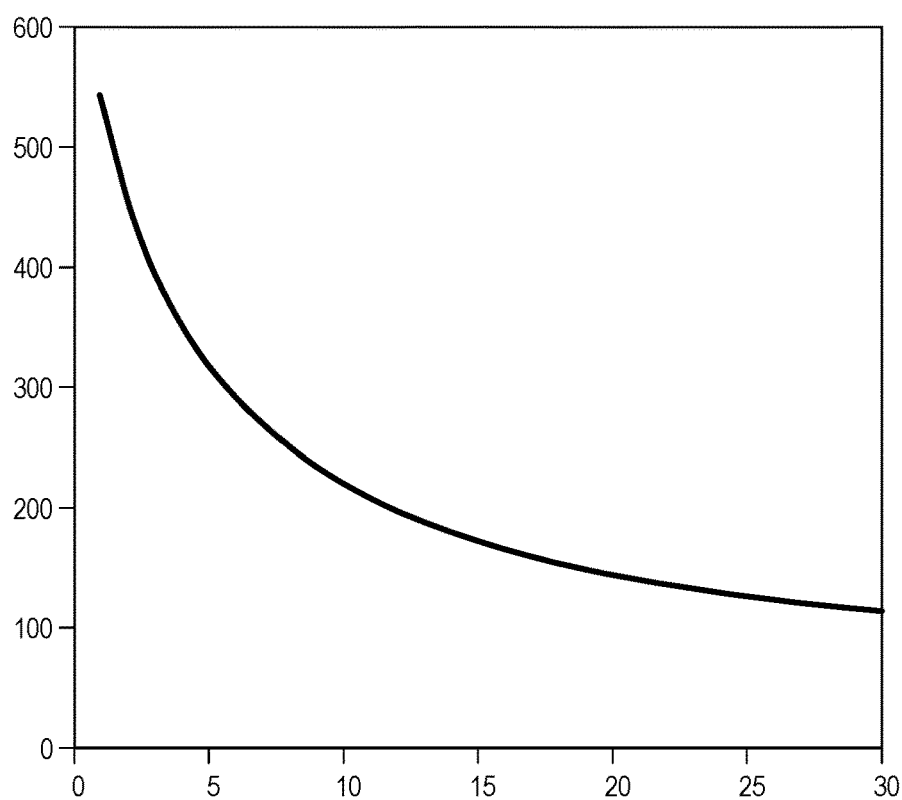
FIG. 3B illustrates prediction errors in backward reshaping converges.

In contrast, in operational scenarios in which spatial gradients are used in computing prediction errors between a reconstructed image and an input image giving rise to the reconstructed with forward and backward reshaping, prediction errors in forward reshaping as illustrated in FIG. 3A diverges, as the prediction errors are propagated relatively efficiently to reshaped values. In the meantime, as illustrated in FIG. 3B, prediction errors in backward reshaping converges as more and more iterations are performed.

Target/Reference Shape or Form in Reshaping Domain

Forward and backward reshaping functions such as those based on MMR or TPB can model forward and backward mapping processes between (1) an input/original high bit depth domain or color space and (2) a low bit-depth reshaping domain or color space. MMR or TPB reshaping functions can be used with any in a wide variety of shapes or forms in which codewords are distributed in a reshaping domain.

Under techniques as described herein, forward and backward reshaping functions can be constructed under two inputs as follows: (1) an input shape or form such as a color cube representing an input/original domain or color space and (2) a (selection or construction of) a target/reference (reshaped) shape or form such as cylinder, donut, torus, twisted torus, etc., representing a reshaping domain.

Given these two inputs, an iterative algorithm/method such as a gradient based BESA algorithm/method as illustrated in FIG. 2B may be performed to obtain optimized values for operational parameters (e.g., MMR coefficients, TPB coefficients, etc.) of (e.g., MMR, TPB, etc.) reshaping functions.

A non-wrapped axis may refer to a single channel or dimension or a (e.g., linear, etc.) combination of multiple channels or dimensions in input video in an input domain, whereas a wrapped axis may refer to an axis in a wrapped reshaping domain mapped from the non-wrapped axis through wrapping transformation(s) with more numerous available codewords than available codewords in the non-wrapped axis. In some operational scenarios, the wrapped axis of the reshaping domain has a geometric shape different from the non-wrapped axis; wherein a total number of available codewords on the wrapped axis is more than a total number of available codewords on the non-wrapped axis. In various operational scenarios, many different target/reference (reshaped) shapes or forms can be used for wrapped reshaping. The wrapped reshaping can be used to change a perceptually significant channel or a visually dominant color channel (e.g., dimension, axis, luminance or luma channel, a specific color channel in a color space, a linear or non-linear combination of two or more channels, etc.) in an input/original high bit depth domain or color space into the same visually dominant color channel—not necessarily represented as a linear axis but rather—represented with a non-linear (or wrapped) axis of a reference shape or form in a low bit depth reshaping domain. The perceptually significant channel or visually dominant color channel may be statically designated or dynamically identified at runtime. The dominant color channel originally represented as an axis of the input/original domain or color space such with fewer codewords such as a linear axis in the color cube is "banded" or "wrapped" into the non-linear or wrapped axis of the reference shape or form such as a circle-like axis, a longest axis in a donut shape, a longest axis in a torus shape, etc.

As a result, the dominant color channel represented in the reference shape or form can obtain more codewords in the reshaping domain with the reference shape or form as compared with a color channel represented by a linear axis under other approaches. Relatively numerous codewords made available by banding or wrapping the linear axis of the color cube representing the dominant color channel into the non-linear axis of the reference shape or form—possibly at the expense of reducing available codewords for non-dominant axis—can be used to avoid viewer perceptible banding or false contouring artifacts in reconstructed images.

Example (e.g., reference, reshaped, etc.) shapes or forms in a reshaping domain as described herein—which can be used to provide non-linear axis with relatively numerous available codewords for perceptually dominant channels in input images—may include, but are not necessarily limited to only, any of: a complete donut, a partial donut, a complete cylinder, a partial cylinder, and so forth.

For the purpose of illustration only, codewords encoded in each of an input video signal and a reshaped video signal can be normalized to a value range such as [0, 1] in each of an input/original domain and a reshaping domain. Additionally, optionally or alternatively, an image container may be used to store (e.g., final, intermediate, input, reshaped, etc.) image content such as the codewords in each of the input/original domain and the reshaping domain using a non-negative integer type.

Transformation functions may be used to map input codewords in an input shape or form such as a color cube into reference shapes or forms with non-linear axis for perceptually dominant channels. While a reference shape or form may be visualized in a color cube, it should be noted that reshaped codewords are constrained to reside in the reference shape or form and are not permitted to lie outside the reference shape or form in other parts of the color cube used for visualization purposes.

For the purpose of illustration only, normalized linear color coordinates (e.g., R, G and B coordinates respectively denoted as x, z and y, etc.) may be used in a coordinate system for a color cube as described herein. It should be noted that some or all techniques as described herein can be similarly applied to non-linear RGB or non-RGB coordinates in non-linear RGB domains or color space as well as linear or non-linear non-RGB domains or color spaces.

Donut Shape or Form in Reshaping Domain

In some operational scenarios, transformation functions may be used to band or wrap one or more input axes in the input color cube into a reference shape or form (or a reshaping domain) represented by a donut shape in a visualization color cube.

For example, transformation functions may be used to band or wrap three input axes in the input color cube with coordinates (x, y, z) into a reference shape or form (or a reshaping domain) represented by a complete donut in a visualization color cube with coordinates $(\hat{x}, \hat{y}, \hat{z})$, as follows:

$$\alpha = 2\pi z \tag{12-1}$$

$$\hat{x} = \frac{1}{1+w}\left(\frac{(1-(x+y)w)(1+\cos(\alpha))}{2} + w(x+0.5)\right) \tag{12-2}$$

$$\hat{y} = \frac{1}{1+w}\left(\frac{(1-(x+y)w)(1+\cos(\alpha))}{2} + w(y+0.5)\right) \tag{12-3}$$

$$\hat{z} = \frac{1}{1+w}\left(\frac{1+\sin(\alpha)-w(x+y)\sin(\alpha)}{2} + \frac{w}{2}\right) \tag{12-4}$$

where z represents a viewer perceptible dominant channel or axis among the three input channels (x, y, z); $\alpha$ represents a wrapped axis converted from the viewer perceptible dominant channel or axis; $\hat{x}$, $\hat{y}$ and $\hat{z}$ represent three axes in a visualization space or cube in which a wrapped shape or form with the wrapped axis can be visualized.

A parameter denoted as w is used in expressions (12) above to control the width of the complete donut. An example data range of w is between [0, 0.5]. If w is 0.5 (corresponding to the widest width), then the inner ellipse of the complete donut reduces to or becomes a point. On the other hand, if w is 0 (corresponding to the narrowest width), then the complete donut reduces to or becomes a one-dimensional ellipse such as the outer ellipse of the complete donut.

Figures 1, 3C:
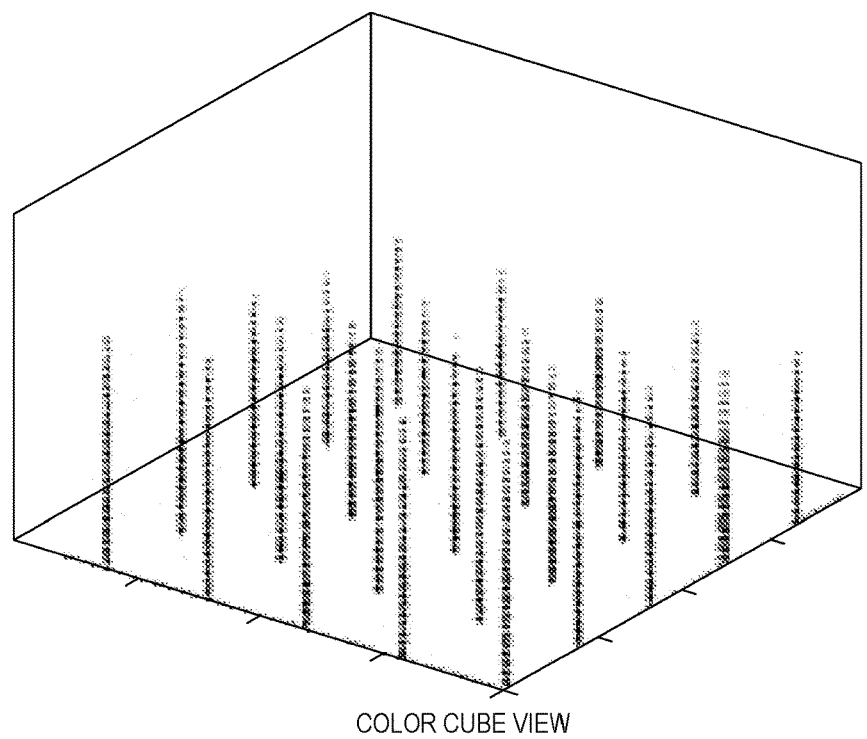
FIG. 3C (FIGS. 3C-1 to 3C-6) illustrates example visualization views of a complete donut in a visualization color cube.
Figures 2, 3C:
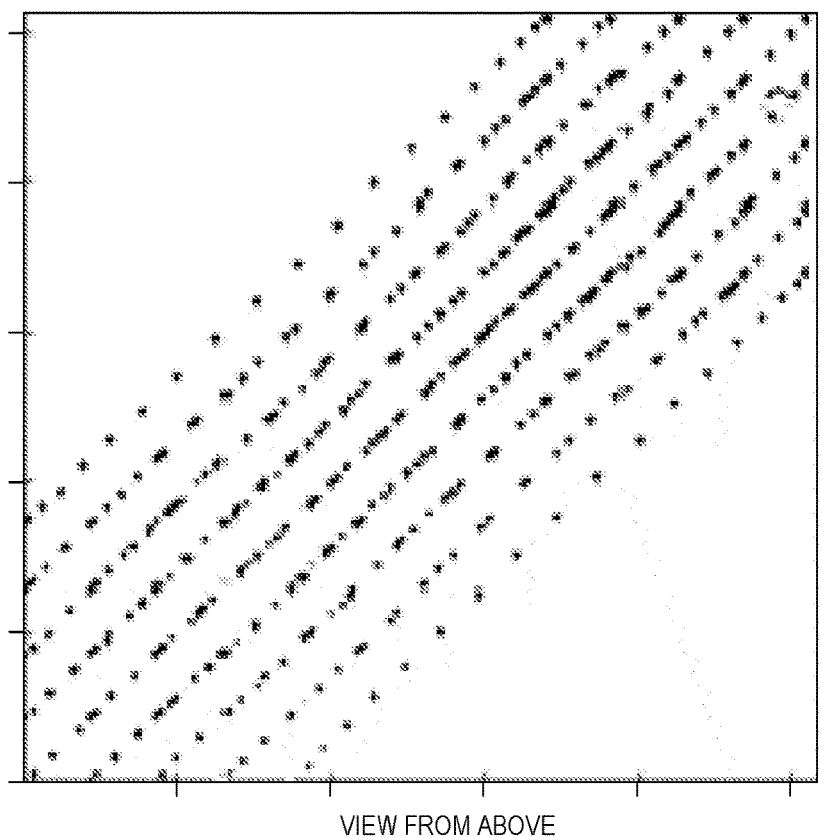
Figures 3, 3C:
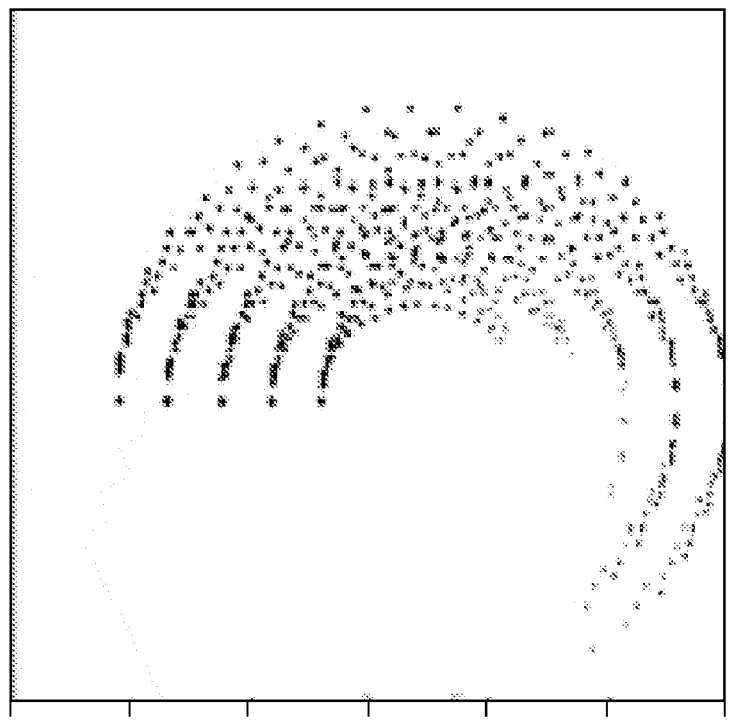
Figures 3, 3C, 4:
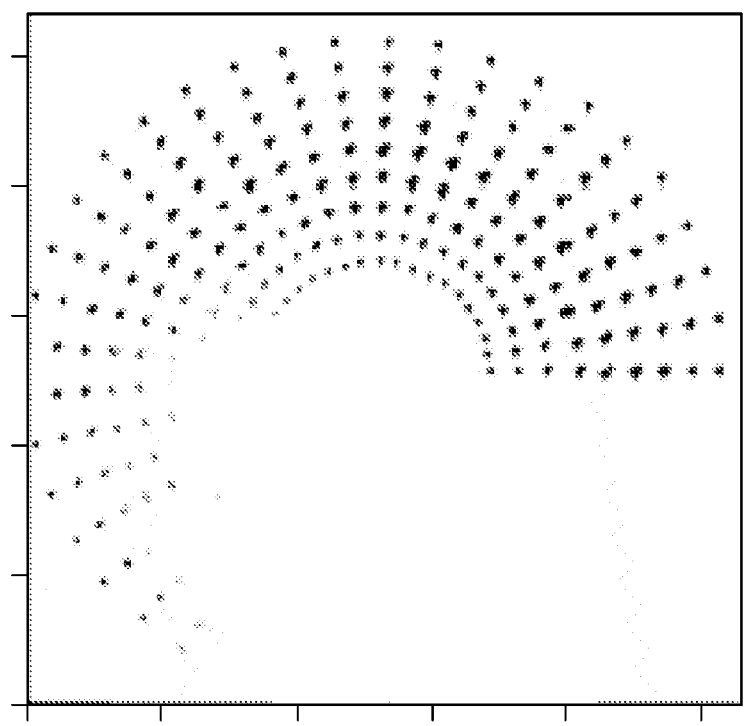

FIG. 3C illustrates example views of the complete donut as visualized in the visualization color cube. As can be seen above in expressions (12), the dominant channel z is banded or wrapped by period functions such as sine or cosine functions. When the width of the donut as controlled by the parameter w is very thin and very close to the boundary, available codewords provided by banding or wrapping the dominant channel z approaches 4.44 times available codewords in a non-banded or wrapped axis in reshaping domain given the same an 8-bit image container, as follows:

$$2\pi\left(\frac{\sqrt{2}}{2}\right) = \sqrt{2}\pi \approx 4.44 \tag{13}$$

The complete donut shape may be used to fully occupy a reshaping domain in a longest direction (e.g., projected as a diagonal direction, etc.) provided by a visualization color cube corresponding to an image container. However, a shortcoming is that the complete donut shape connects end to end and thus provides no error margin. As the beginning of the complete donut is connected back to the ending of the complete donut, any small value change or error—for example caused by image processing performed in the reshaping domain—may dramatically change values in reconstructed images. A black pixel in an input image can possibly become a white pixel in a reconstructed image, caused by small value changes or errors introduced (e.g., by image processing operations, etc.) to the wrapped and connected shape in the reshaping domain. This is similar to "overflow" and "underflow" issues in computations.

In some operational scenarios, a gap may be inserted or used in a reshaping domain represented with a donut shape, to help avoid or ameliorate this overflow or underflow problem and to help tolerate or better handle small value changes or errors that could be introduced by various image processing operations involved in end-to-end image delivery between receiving an input image and reconstructing an image to approximate the input image.

A parameter, g, may be introduced in transformation functions to control a gap size or extent of a gap portion inserted in a donut shape. The parameter g may be of a value in value range [0, 1]. If g is 1, then the donut shape reduces to or becomes a plane. If g is 0, then the donut shape becomes a complete donut.

The transformation functions representing a mapping of the input color cube (x, y, z) to a reshaping domain $(\hat{x}, \hat{y}, \hat{z})$ with a gap portion in a donut shape may be given as follows:

$$\alpha = \left(4z(1-g) + \frac{g}{2}\right)\frac{\pi}{2} \quad (14\text{-}1)$$

$$\hat{x} = \frac{1}{1+w}\left(\frac{(1-(x+y)w)(1+\cos(\alpha))}{2} + w(x+0.5)\right) \quad (14\text{-}2)$$

$$\hat{y} = \frac{1}{1+w}\left(\frac{(1-(x+y)w)(1+\cos(\alpha))}{2} + w(y+0.5)\right) \quad (14\text{-}3)$$

$$\hat{z} = \frac{1}{1+w}\left(\frac{1+\sin(\alpha) - w(x+y)\sin(\alpha)}{2} + \frac{w}{2}\right) \quad (14\text{-}4)$$

where z represents a viewer perceptible dominant channel or axis among the three input channels (x, y, z); α represents a wrapped axis converted from the viewer perceptible dominant channel or axis; $\hat{x}$, $\hat{y}$ and $\hat{z}$ represent three axes in a visualization space or cube in which a wrapped shape or form with the wrapped axis can be visualized.

Figures 3, 3C, 4, 5:
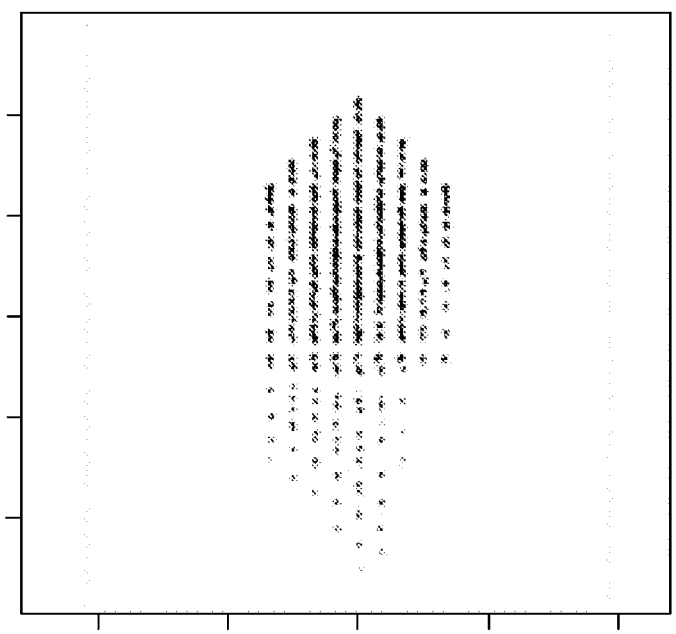
FIG. 5 illustrates a simplified block diagram of an example hardware platform on which a computer or a computing device as described herein may be implemented.
Figures 3, 3C, 4, 5, 6:
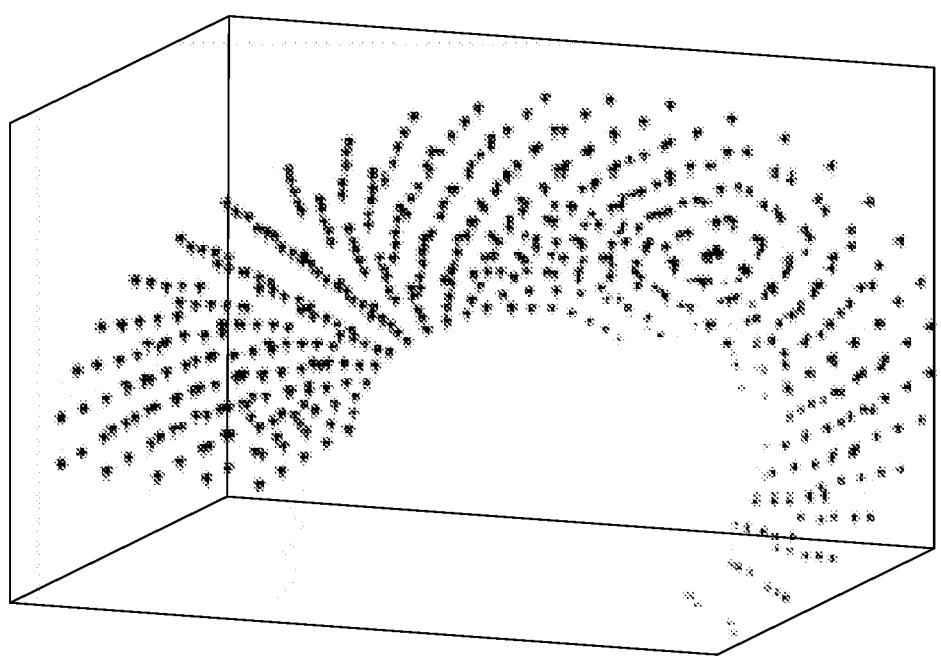
Figures 1, 3D:
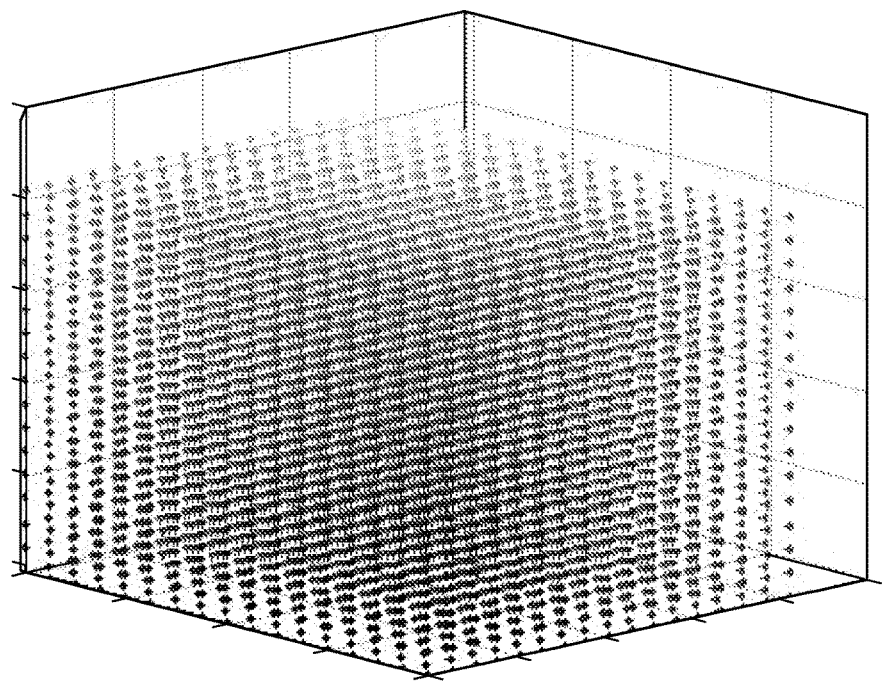
FIG. 3D (FIGS. 3D-1 to 3D-6) and FIG. 3E (FIGS. 3E-1 to 3E-6) illustrate example visualization views of partial donuts in a visualization color cube.
Figures 2, 3D:
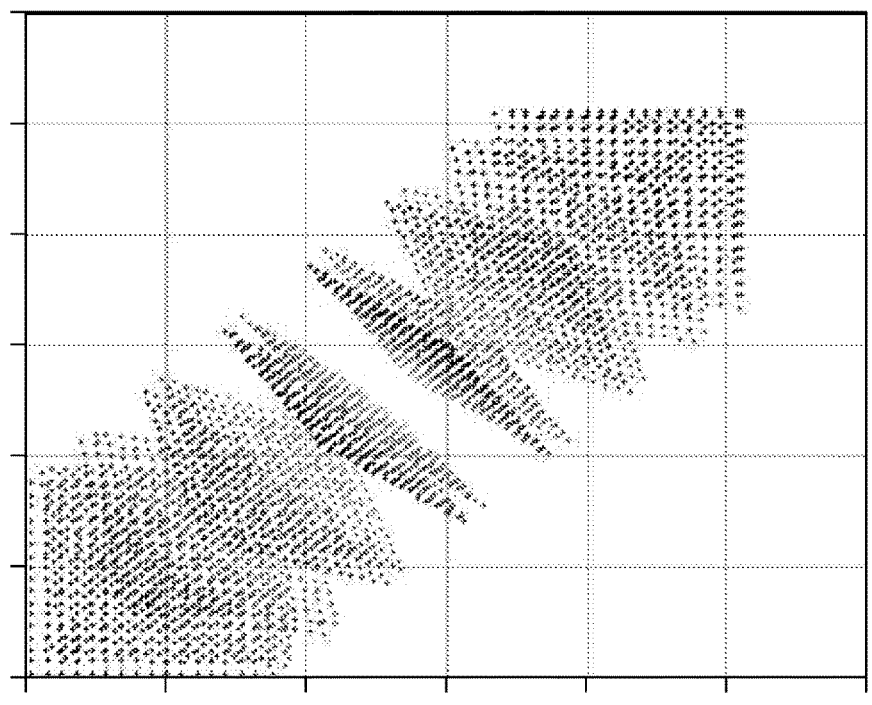
Figures 3, 3D:
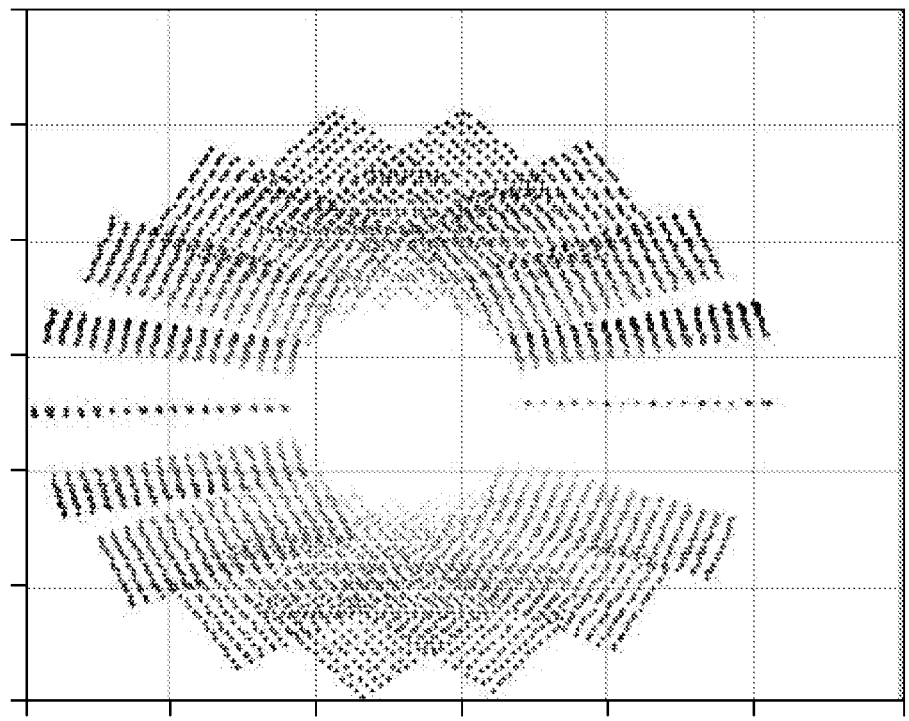
Figures 3, 3D, 4:
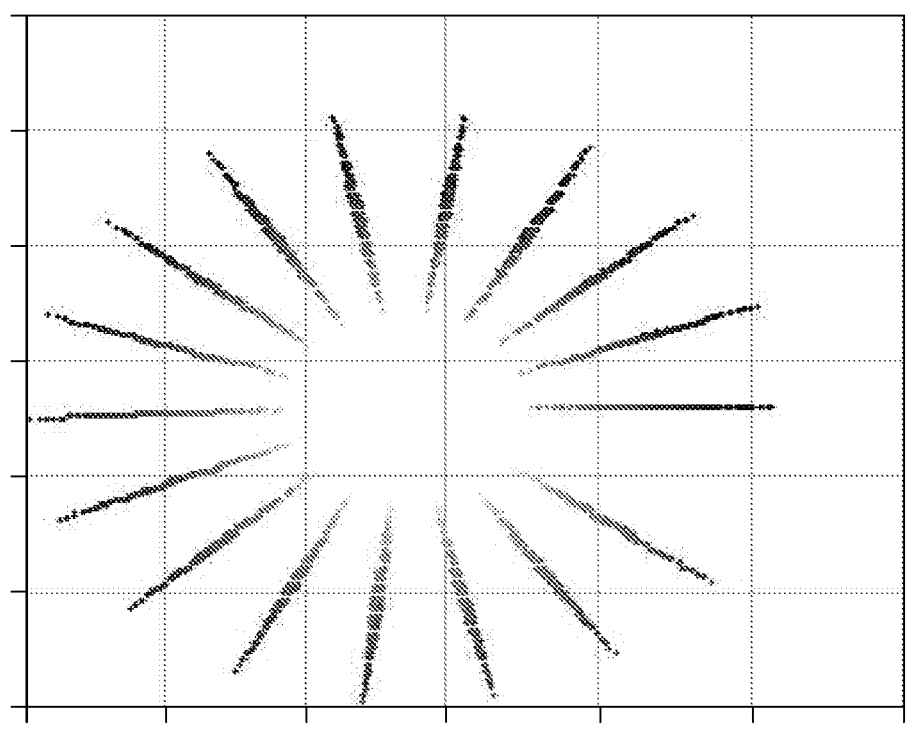
Figures 3, 3D, 4, 5:
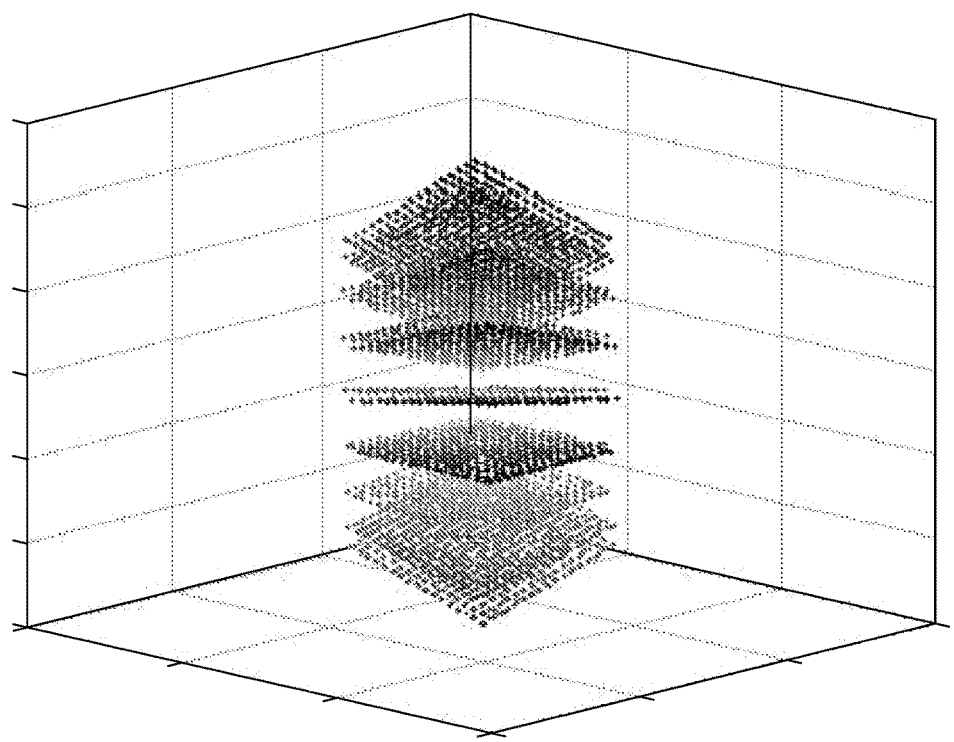
Figures 3, 3D, 4, 5, 6:
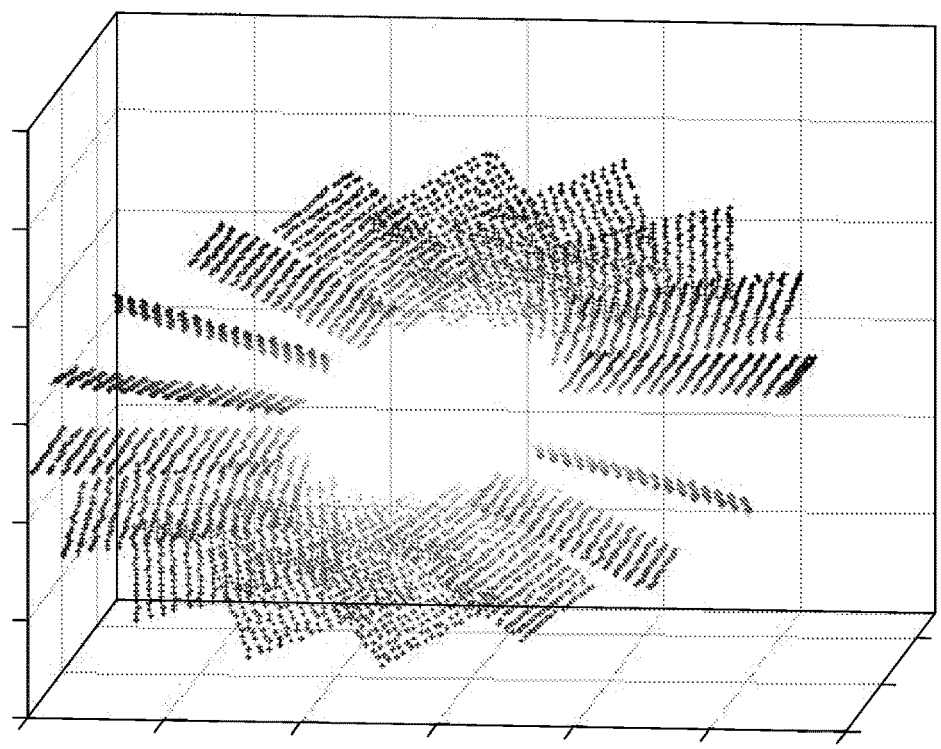

FIG. 3D illustrates example views of a partial donut as visualized in the visualization color cube. As can be seen above in expressions (14), the dominant channel z is banded or wrapped by period functions such as sine or cosine functions. In addition, a gap is inserted to prevent "overflow/underflow". When the width of the donut as controlled by the parameter w is very thin and very close to the boundary, available codewords provided by banding or wrapping the dominant channel z approaches 4.44 (1−g) times available codewords in a non-banded or wrapped axis in reshaping domain given the same an 8-bit image container as deducted by the gap portion, as follows:

$$2\pi\left(\frac{\sqrt{2}}{2}\right)(1-g) = \sqrt{2}\pi(1-g) \approx 4.44(1-g) \quad (15)$$

Another solution to the overflow/underflow problem may be provided using multiple small gaps interleaving in a complete donut instead of inserting a single relatively large gap into the complete donut.

Similar to the donut shape with a single gap, a parameter, w, may be introduced to control the width of the donut shape with multiple gaps or gap portions. A value range of w may be between [0, 0.5]. If the w is 0.5 then the inner ellipse will become a point. If w is 0 then the donut will become the ellipse which is the outer ellipse of the seen donut. In addition, a parameter, g, may be introduced to control an overall gap size or extent of the gap portions such as four gap portions placed in four different places or locations of the donut shape. If the overall gap size or extent g is 0.2, four 0.05 gaps or gap portions are placed in four different places or locations of the donut shape.

The transformation functions representing a mapping of the input color cube (x, y, z) to a reshaping domain $(\hat{x}, \hat{y}, \hat{z})$ with four gap portions in a donut shape may be given as follows:

If $z \le 0.25$ $$\alpha = \left(4z(1-g) + \frac{g}{2}\right)\frac{\pi}{2} \quad (16\text{-}1)$$

If $0.25 < z \le 0.5$ $$\alpha = \left(4z(1-g) + \frac{g}{2} + 1\right)\frac{\pi}{2} \quad (16\text{-}2)$$

If $0.5 < z \le 0.75$ $$\alpha = \left(4z(1-g) + \frac{g}{2} + 2\right)\frac{\pi}{2} \quad (16\text{-}3)$$

If $0.75 < z \le 1$ $$\alpha = \left(4z(1-g) + \frac{g}{2} + 3\right)\frac{\pi}{2} \quad (16\text{-}4)$$

$$\hat{x} = \frac{1}{1+w}\left(\frac{(1-(x+y)w)(1+\cos(\alpha))}{2} + w(x+0.5)\right) \quad (16\text{-}5)$$

$$\hat{y} = \frac{1}{1+w}\left(\frac{(1-(x+y)w)(1+\cos(\alpha))}{2} + w(y+0.5)\right) \quad (16\text{-}6)$$

$$\hat{z} = \frac{1}{1+W}\left(\frac{1+\sin(\alpha) - w(x+y)\sin(\alpha)}{2} + \frac{w}{2}\right) \quad (16\text{-}7)$$

where z represents a viewer perceptible dominant channel or axis among the three input channels (x, y, z); α represents a wrapped axis converted from the viewer perceptible dominant channel or axis; $\hat{x}$, $\hat{y}$ and $\hat{z}$ represent three axes in a visualization space or cube in which a wrapped shape or form with the wrapped axis can be visualized.

Figures 1, 3E:
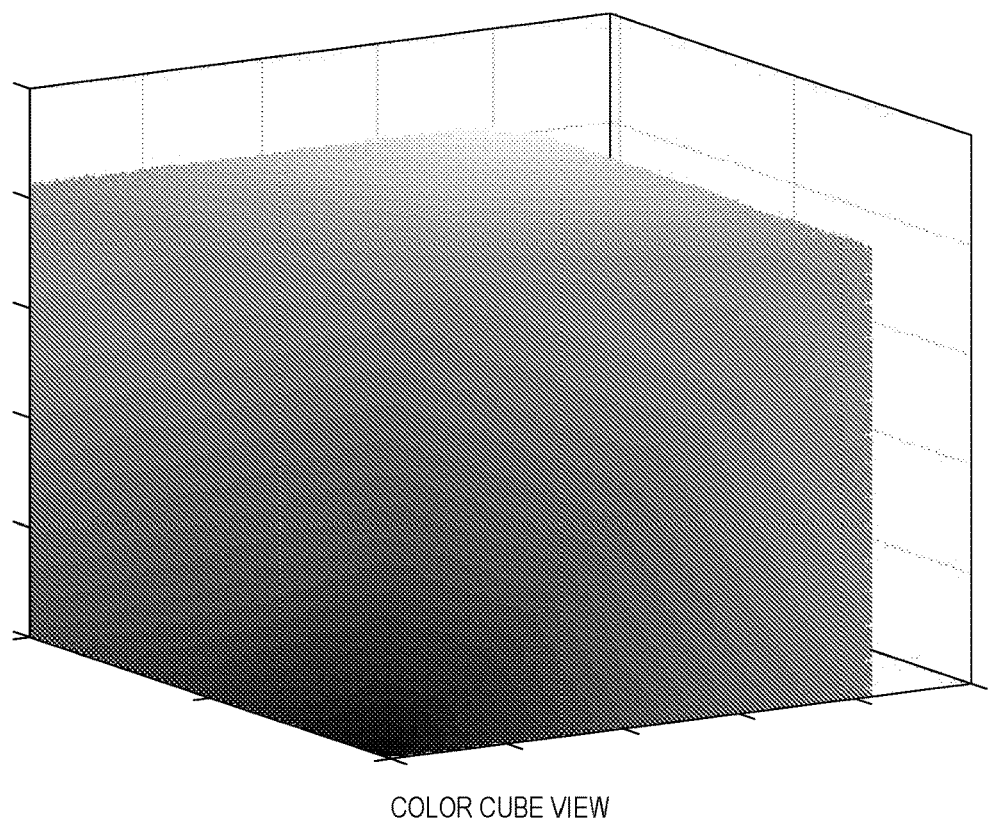
Figures 2, 3E:
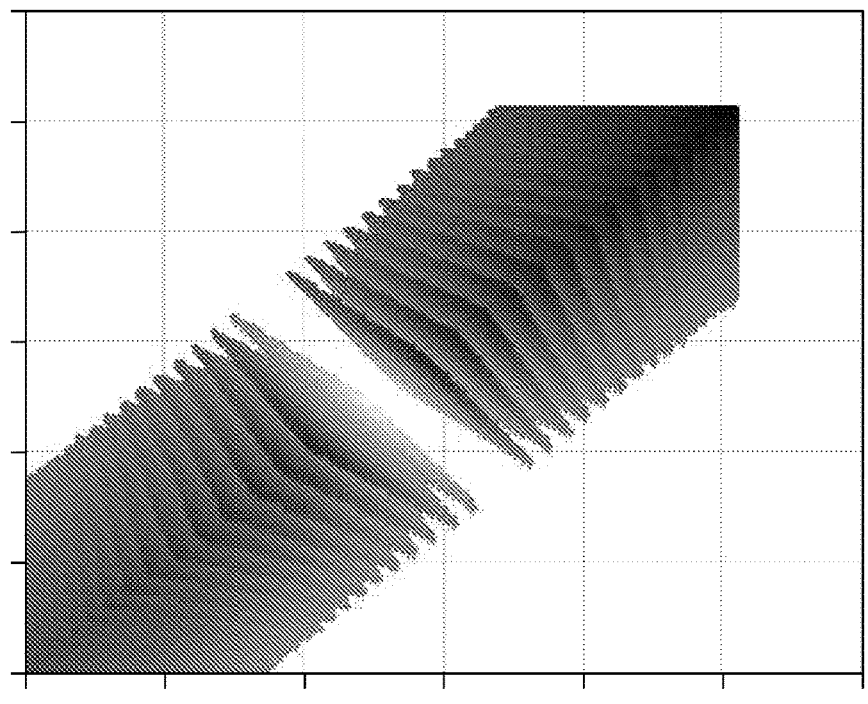
FIG. 3F (FIGS. 3F-1 to 3F-4) illustrates example visualization views of a complete cylinder in a visualization color cube.
FIG. 3G (FIGS. 3G-1 to 3G-4) illustrates example visualization views of a partial cylinder in a visualization color cube.
FIG. 3H illustrates example pixels of an input image in a grid representation.
FIG. 3I illustrates example mean values of non-empty clusters in an input image.
FIG. 3J illustrates example centers of non-empty clusters in an input image.
FIG. 3K illustrates example centers of non-empty clusters as well as neighboring empty clusters in an input image.
FIG. 3L illustrates an example distribution of pixels in an input image visualized in a color cube.
FIG. 3M illustrates example points generated from a distribution of pixels in an input image.
FIG. 3N illustrates example points forward transformed through wrapped reshaping.
Figures 3, 3E:
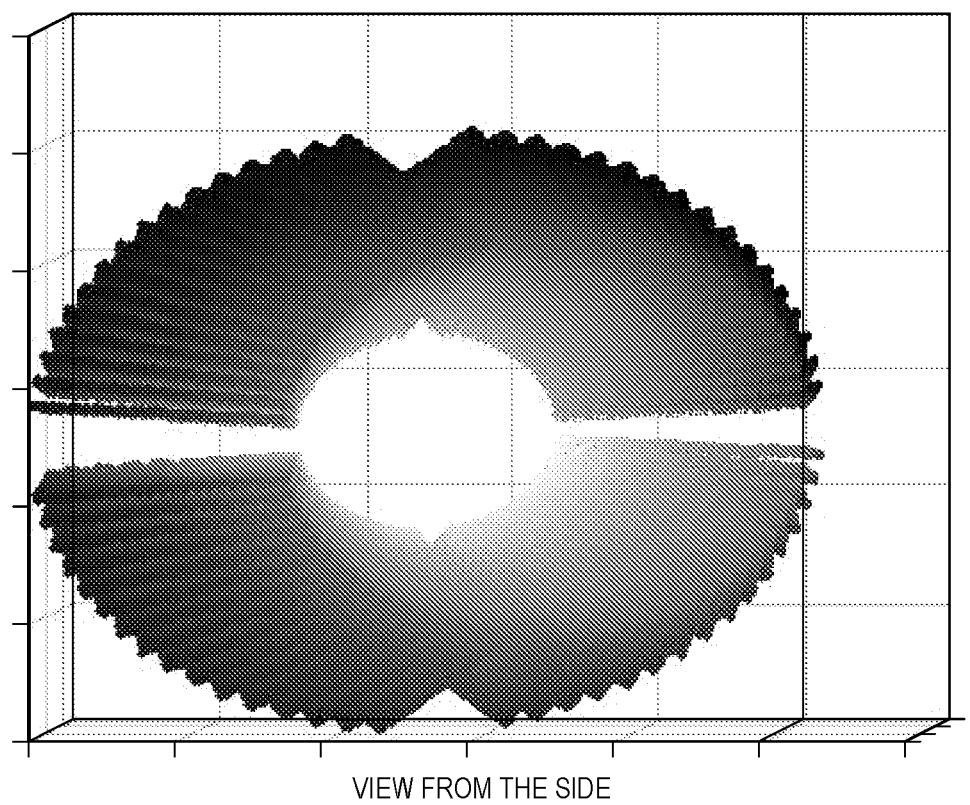
Figures 3, 3E, 4:
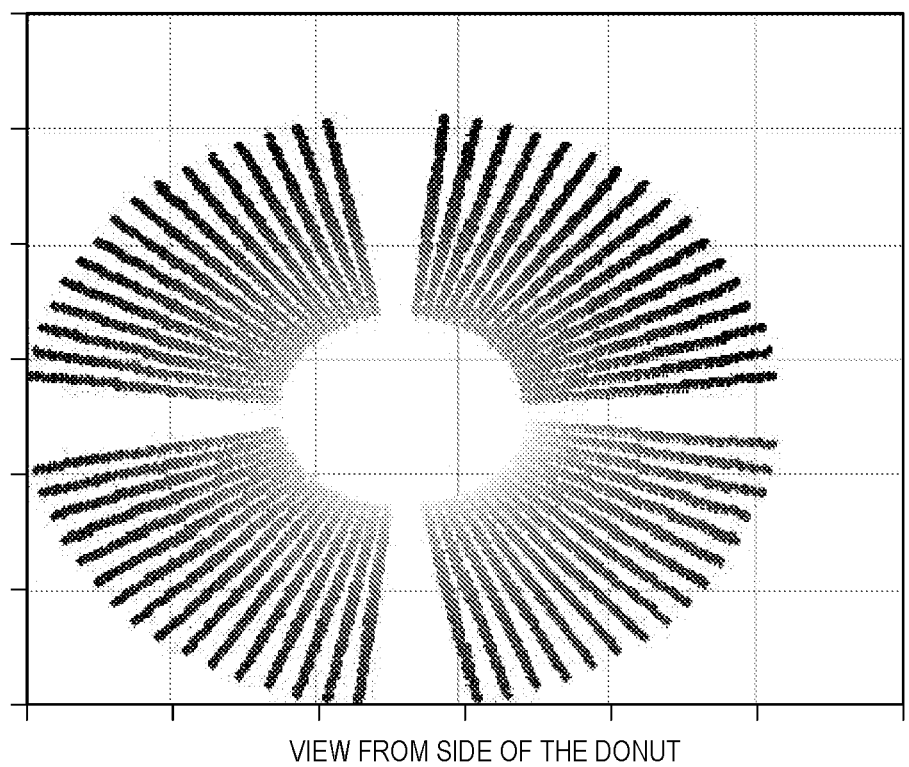
FIG. 4A and FIG. 4B illustrate example process flows.
Figures 3, 3E, 4, 5:
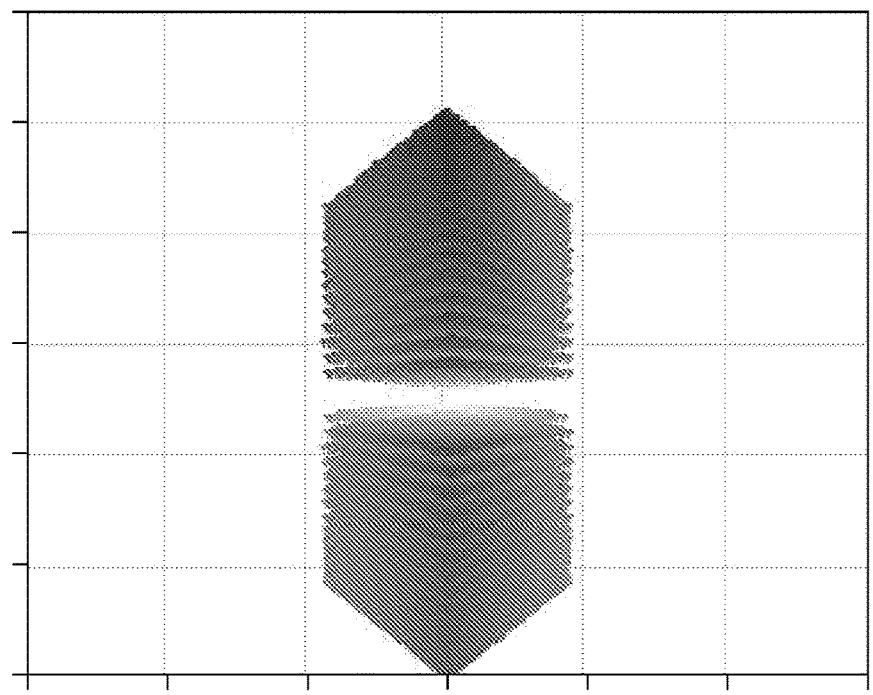
Figures 3, 3E, 4, 5, 6:
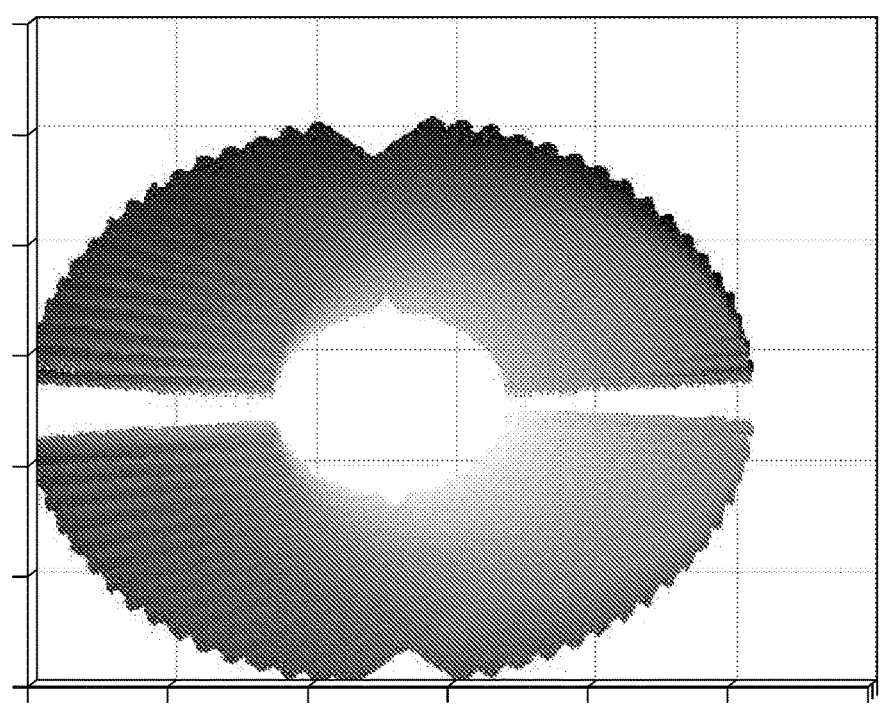

FIG. 3E illustrates example views of a partial donut as visualized in the visualization color cube. As can be seen above in expressions (16), the dominant channel z is banded or wrapped by period functions such as sine or cosine functions. In addition, four gap portions are inserted to prevent "overflow/underflow". When the width of the donut as controlled by the parameter w is very thin and very close to the boundary, available codewords provided by banding or wrapping the dominant channel z approaches 4.44 (1−g) times available codewords in a non-banded or wrapped axis in reshaping domain given the same an 8-bit image container as deducted by the gap portions, as follows:

$$2\pi\left(\frac{\sqrt{2}}{2}\right)(1-g) = \sqrt{2}\pi(1-g) \approx 4.44(1-g) \quad (17)$$

While donut shapes may have relatively high theoretical maximal available codewords, shortcomings may exist. For example, for codewords further and further deviating from the wrapped axis—e.g., projected into a diagonal line in a visualizing color cube—in the reshaping domain as represented by a donut shape, quantization errors can become greater and greater. As overall mapping errors may become relatively large, average performance for all color values may be relatively significantly affected with donut shapes. In addition, numerical issues such as numeric instability may be encountered with donut shapes when TPB or MMR reshaping functions are used to model forward and backward reshaping mappings or operations.

Cylinder Shape or Form in Reshaping Domain

In some operational scenarios, to help resolve issues in the donut shapes or forms, transformation functions may be used to band or wrap one or more input axes in the input color cube into a reference shape or form (or a reshaping domain) represented by a cylinder shape in a visualization color cube.

For example, transformation functions may be used to band or wrap three input axes in the input color cube with coordinates (x, y, z) into a reference shape or form (or a reshaping domain) represented by a complete cylinder in a visualization color cube with coordinates ($\hat{x}, \hat{y}, \hat{z}$), as follows:

$$\alpha = 2\pi z \quad (18\text{-}1)$$

$$\hat{x} = x \quad (18\text{-}2)$$

$$\hat{y} = \left(\frac{(1-yw)(1+\cos(\alpha))}{2} + \frac{wy}{2}\right) \quad (18\text{-}3)$$

$$\hat{z} = \left(\frac{(1-yw)(1+\sin(\alpha))}{2} + \frac{wy}{2}\right) \quad (18\text{-}4)$$

where z represents a viewer perceptible dominant channel or axis among the three input channels (x, y, z); $\alpha$ represents a wrapped axis converted from the viewer perceptible dominant channel or axis; $\hat{x}, \hat{y}$ and $\hat{z}$ represent three axes in a visualization space or cube in which a wrapped shape or form with the wrapped axis can be visualized.

A parameter denoted as w is used in expressions (18) above to control the width of the complete cylinder. An example data range of w is between [0, 0.5]. If w is 0.5 (corresponding to the widest width), then the inner circle of the complete cylinder reduces to or becomes a point. On the other hand, if w is 0 (corresponding to the narrowest width), then the complete cylinder reduces to or becomes a one-dimensional circle such as the outer circle of the complete cylinder.

Figures 1, 3F:
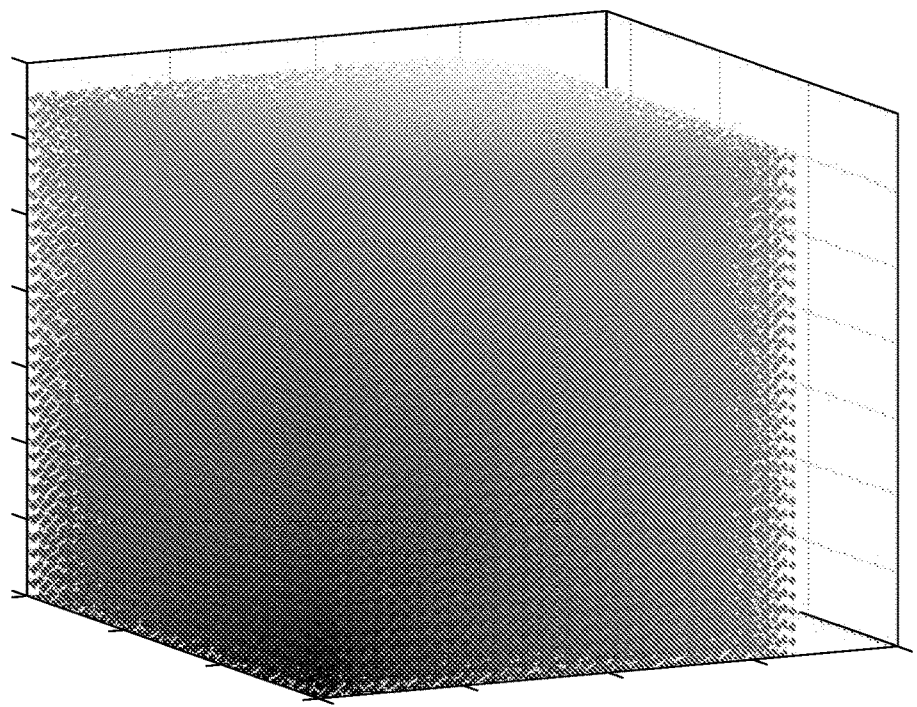
Figures 2, 3F:
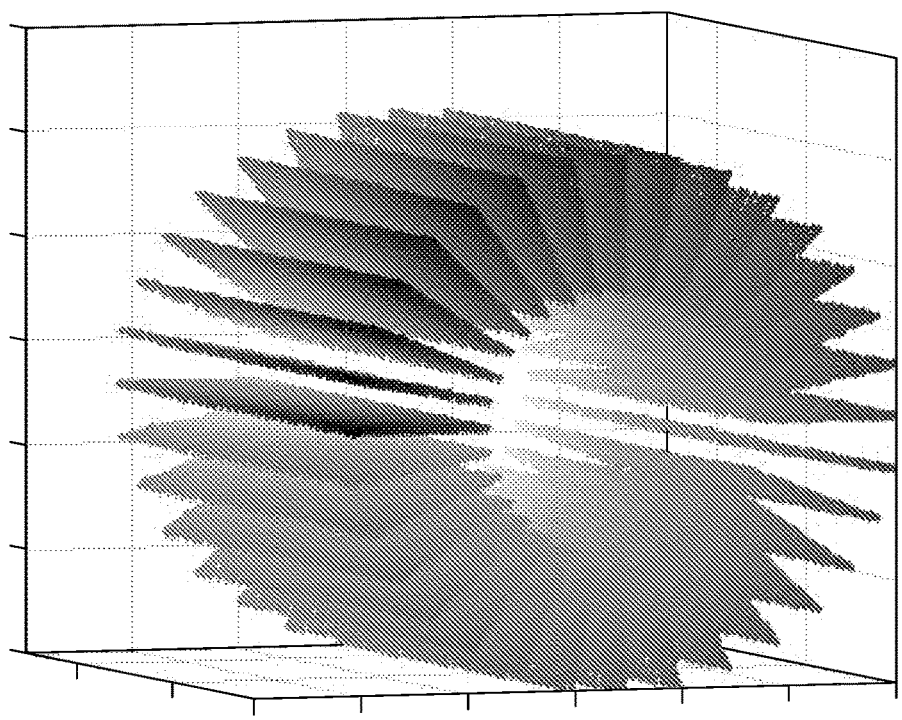
Figures 3, 3F:
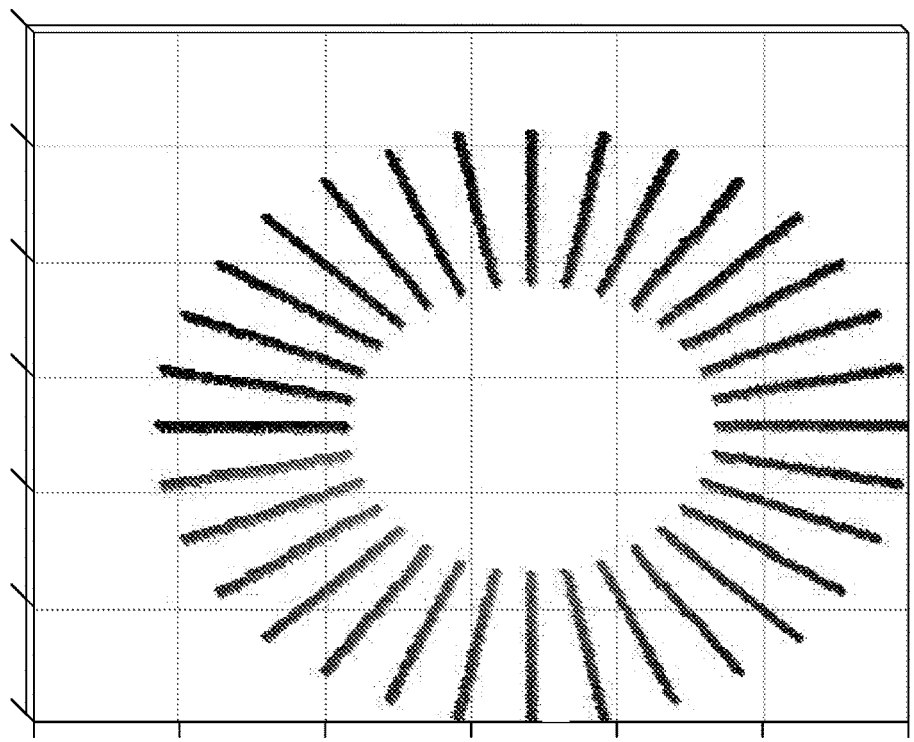
Figures 3, 3F, 4:
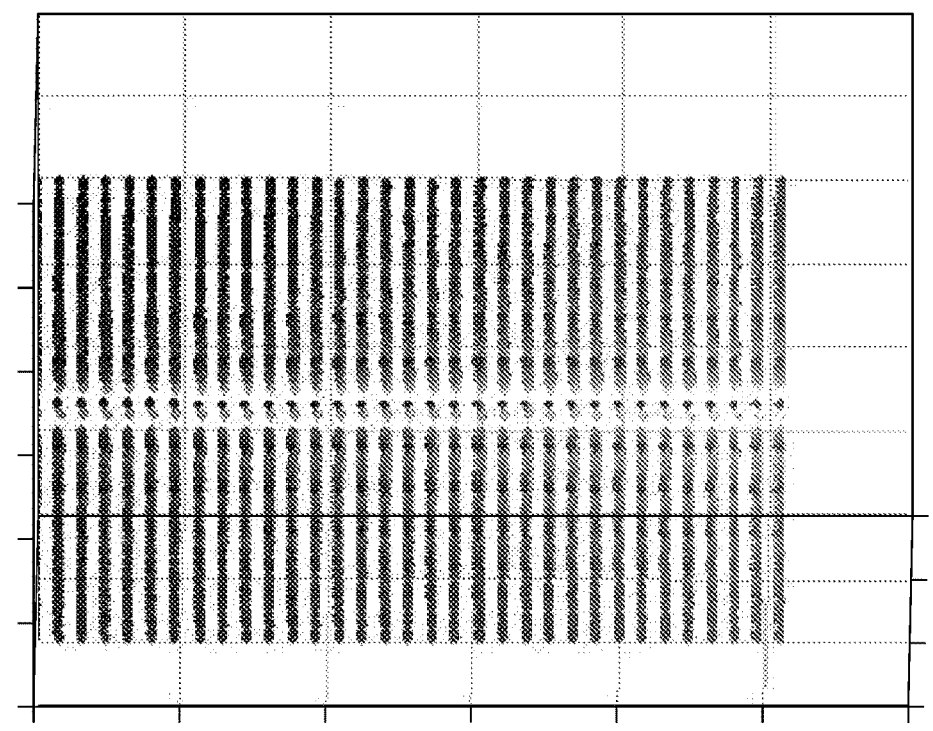

FIG. 3F illustrates example views of the complete cylinder as visualized in the visualization color cube. As can be seen above in expressions (18), the dominant channel z is banded or wrapped by period functions such as sine or cosine functions. When the width of the cylinder as controlled by the parameter w is very thin and very close to the boundary, available codewords provided by banding or wrapping the dominant channel z approaches $\pi$ times available codewords in a non-banded or wrapped axis in reshaping domain given the same an 8-bit image container, as follows:

$$2\pi\left(\frac{1}{2}\right) = \pi \quad (19)$$

While the complete cylinder shape may be used to fully occupy a reshaping domain in a longest direction (e.g., projected as a diagonal direction, etc.) provided by a visualization color cube corresponding to an image container, the same issue encountered in a complete donut shape such as the overflow/underflow issue may also exist in a complete cylinder shape.

In some operational scenarios, a gap may be inserted or used in a reshaping domain represented with a cylinder shape, to help avoid or ameliorate this overflow or underflow problem and to help tolerate or better handle small value changes or errors that could be introduced by various image processing operations involved in end-to-end image delivery between receiving an input image and reconstructing an image to approximate the input image.

A parameter, g, may be introduced in transformation functions to control a gap size or extent of a gap portion inserted in a cylinder shape. The parameter g may be of a value in value range [0, 1]. If g is 1, then the cylinder shape reduces to or becomes a plane. If g is 0, then the cylinder shape becomes a complete cylinder.

The transformation functions representing a mapping of the input color cube (x, y, z) to a reshaping domain ($\hat{x}, \hat{y}, \hat{z}$) with a gap portion in a cylinder shape may be given as follows:

$$\alpha = \left(4z(1-g) + \frac{g}{2}\right)\frac{\pi}{2} \quad (20\text{-}1)$$

$$\hat{x} = x \quad (20\text{-}2)$$

$$\hat{y} = \left(\frac{(1-yw)(1+\cos(\alpha))}{2} + \frac{wy}{2}\right) \quad (20\text{-}3)$$

$$\hat{z} = \left(\frac{(1-yw)(1+\sin(\alpha))}{2} + \frac{wy}{2}\right) \quad (20\text{-}4)$$

where z represents a viewer perceptible dominant channel or axis among the three input channels (x, y, z); $\alpha$ represents a wrapped axis converted from the viewer perceptible dominant channel or axis; $\hat{x}, \hat{y}$ and $\hat{z}$ represent three axes in a visualization space or cube in which a wrapped shape or form with the wrapped axis can be visualized.

Figures 1, 3G:
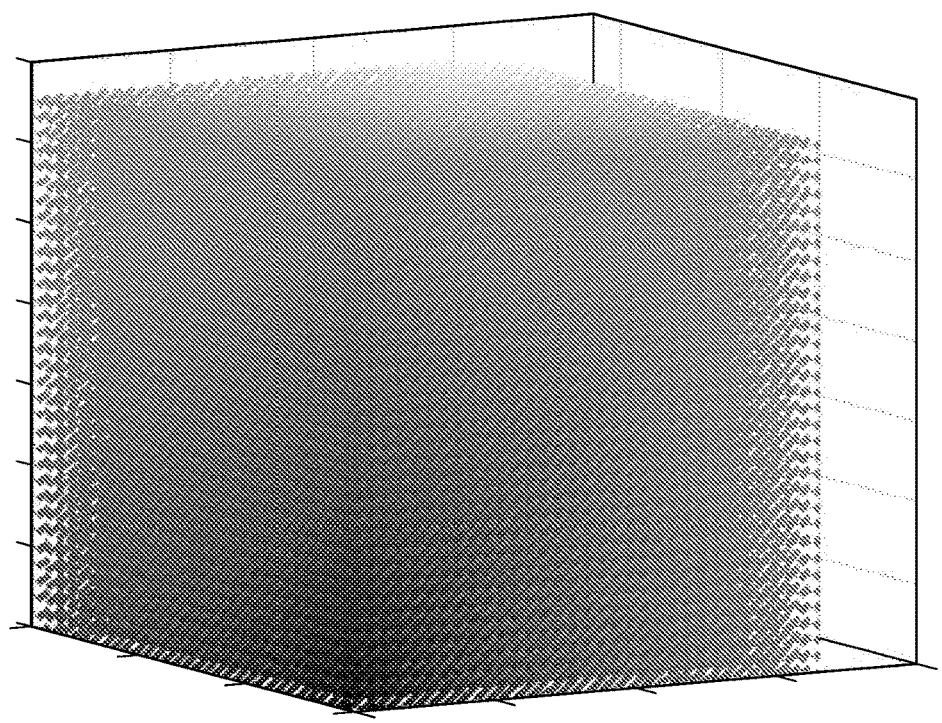
Figures 2, 3G:
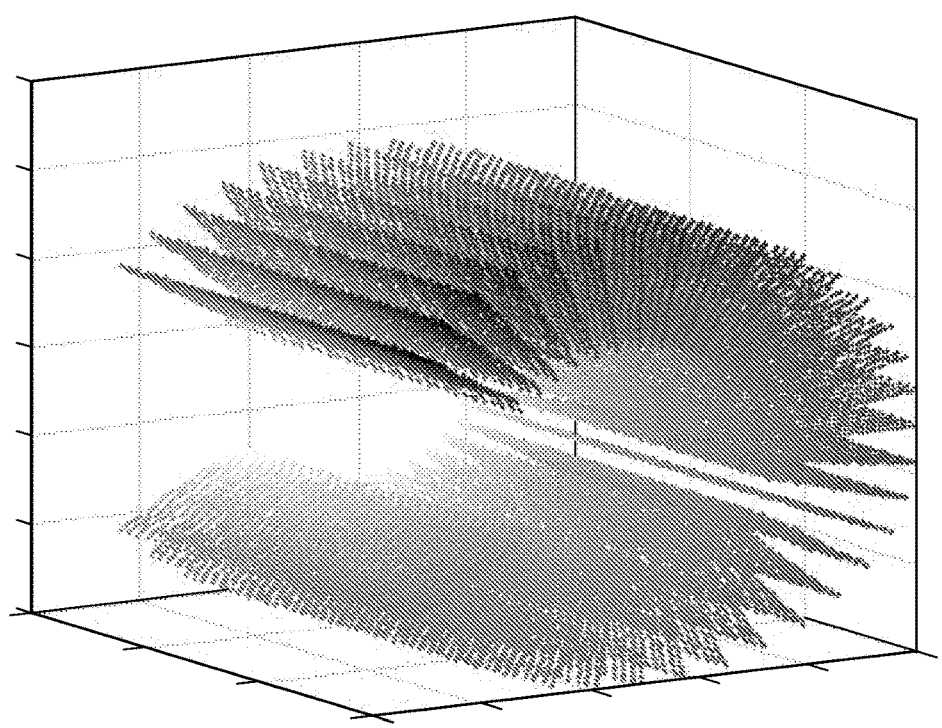
Figures 3, 3G:
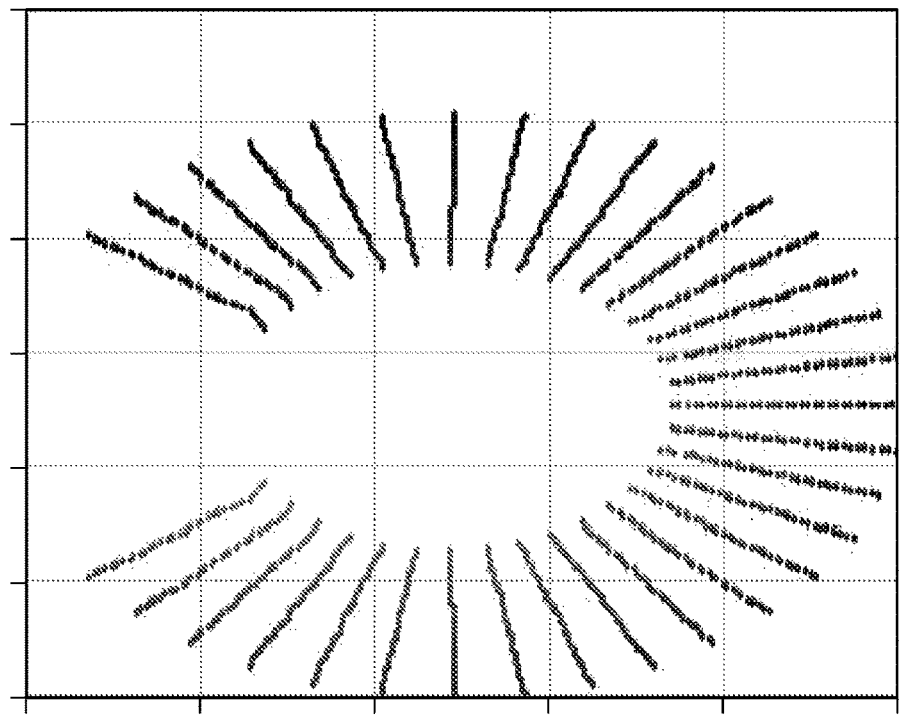
Figures 3, 3G, 4:
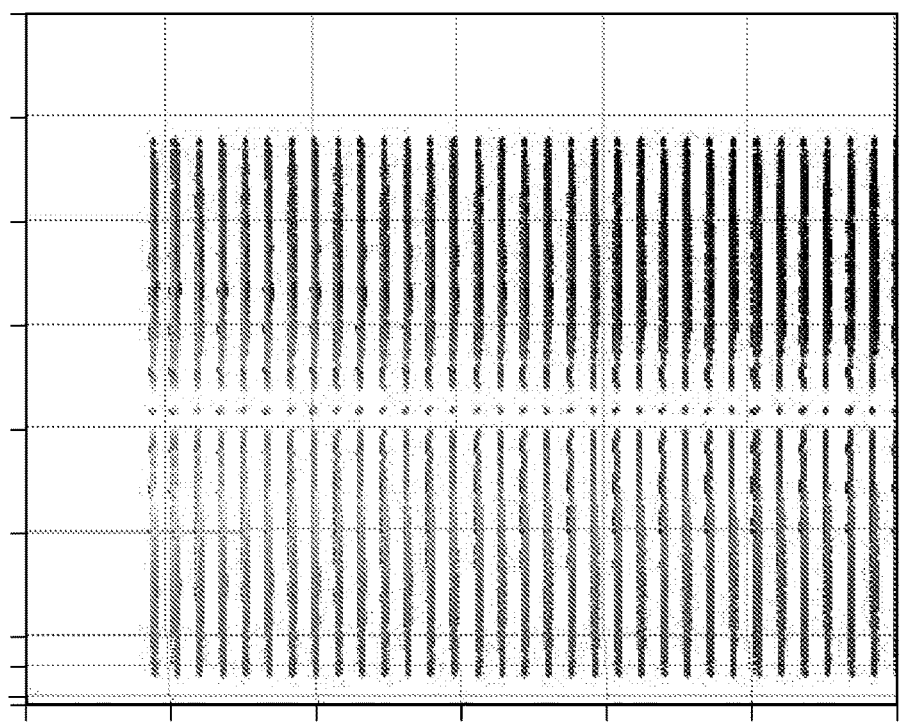

FIG. 3G illustrates example views of a partial cylinder as visualized in the visualization color cube. As can be seen above in expressions (20), the dominant channel z is banded or wrapped by period functions such as sine or cosine functions. In addition, a gap is inserted to prevent "overflow/underflow". When the width of the donut as controlled by the parameter w is very thin and very close to the boundary, available codewords provided by banding or wrapping the dominant channel z approaches $\pi(1-g)$ times available codewords in a non-banded or wrapped axis in reshaping domain given the same an 8-bit image container as deducted by the gap portion, as follows:

$$2\pi\left(\frac{1}{2}\right)(1-g) = \pi(1-g) \quad (21)$$

Theoretical codeword augments of different example shapes as discussed herein are listed in TABLE 1 below ($\pi$=3.14159).

TABLE 1

| Shape | Theoretical Codeword |
| --- | --- |
| Complete Donut | 4.44 |
| Donut with one gap | 4.44(1 − g) |
| Donut with 4 gaps | 4.44(1 − g) |
| Complete Cylinder | π |
| Cylinder with one gap | π(1 − g) |

As can be seen above, the complete donut has the best codeword augmentation, while the cylinder with one gap has the worst codeword augmentation. On the other hand, the donut shape suffers more color distortions for codewords located at or near color cube boundaries as those codewords are mapped to smaller ellipse than ellipses to which codewords located elsewhere. In comparison, the cylinder shape offers a relatively uniform distortions across codewords at different locations. In addition, as noted, a shape without gap may suffer overflow/underflow and thus cause color artifacts. With these observations, in some operational scenarios, a donut or cylinder shape with gap may be used as target (e.g., reference, reshaped, etc.) shapes or forms in reshaping domains for the purpose of augmenting availability of codewords in dominant axes. In particular, in some operational scenarios, a cylinder shape with gap may be used to augment available codewords with relatively uniform distortions.

It should be noted that, in various embodiments, other shapes or forms other than cylinder or donut shapes or forms may be used as target (e.g., reference, reshaped, etc.) shapes or forms in reshaping domains for the purpose of augmenting availability of codewords in dominant axes.

Constructing Content-Dependent Optimized Reshaping Functions

A simple method to construct the reshaping function is to use a static mapping that maps a full input 3D color cube representing an input/original domain to a pre-defined reference or reshaped shape or form in a reshaping domain without considering or being dependent on content dependent color distributions in the input/original domain. This may be the fastest solution to perform reshaping.

On the other hand, prediction errors may be further improved or reduced if actual content information such as codeword or color distributions in input images is taken into account in selecting specific reference or reshaped shapes or forms and in selecting specific operational parameters in connection with the specific reference or reshaped shapes or forms. Reshaping functions generated under this approach may be referred to as dynamic reshaping functions.

Different methods such as (1) a fully dynamic method/solution and (2) a two-stage method/solution may be implemented or applied to construct dynamic reshaping function.

To fully capture or take into account a specific codeword or color distribution in an input image of an input video signal, the fully dynamic solution can be performed on-the-fly at runtime in the deployment or prediction phase. Both primary reshaping and secondary reshaping can be combined together as one single shot or processing unit and used to generate specific values for operational parameters such as scaling factors/values, MMR coefficients and/or TPB coefficients for reshaping functions. While being content dependent and able to fully utilize or take into consideration an actual codeword or color distribution in an input image, the fully dynamic solution may not use pre-built reshaping functions obtained or generated in a training phase and thus may incur a relatively high computational costs and complexities.

Four different approaches/ways may be used in the full dynamic solution to group input codewords or colors before passing information about the codewords or colors to a reshaping function optimization process.

Figure 3H:
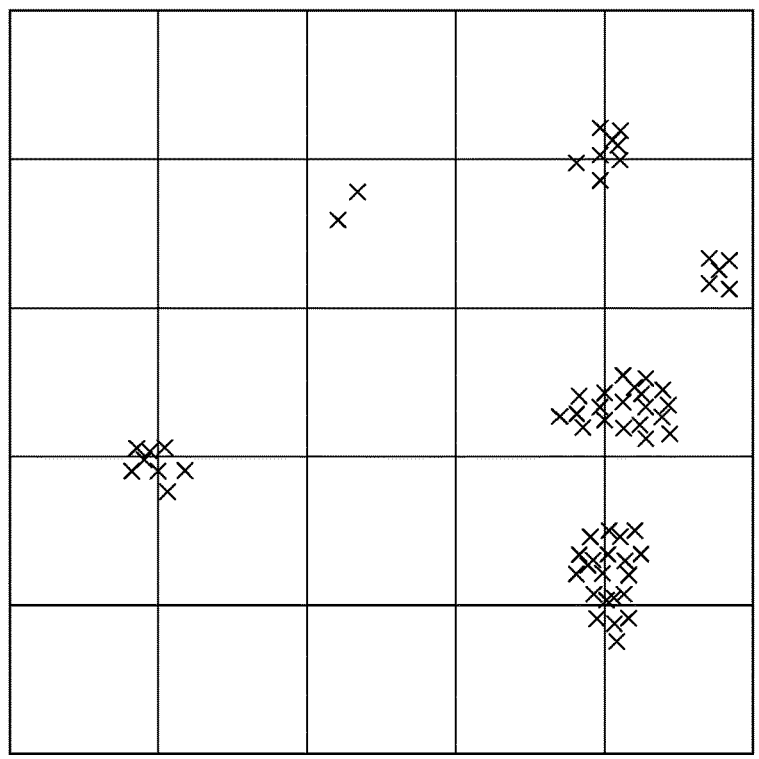

The first of the four approaches/ways to implement the full dynamic solution may be referred to as a pixel based approach in which all pixels or codewords thereof in the input image—as illustrated in FIG. 3H—are taken as input for TPB training (at runtime instead of in a training phase). As this approach involves using all the pixels or codewords in the optimization process, a relative large memory space and a relatively high computational cost or complexity may be incurred in the optimization process to generate or obtain optimized values for operational parameters such as MMR or TPB coefficients in forward and backward reshaping functions.

Figure 3I:
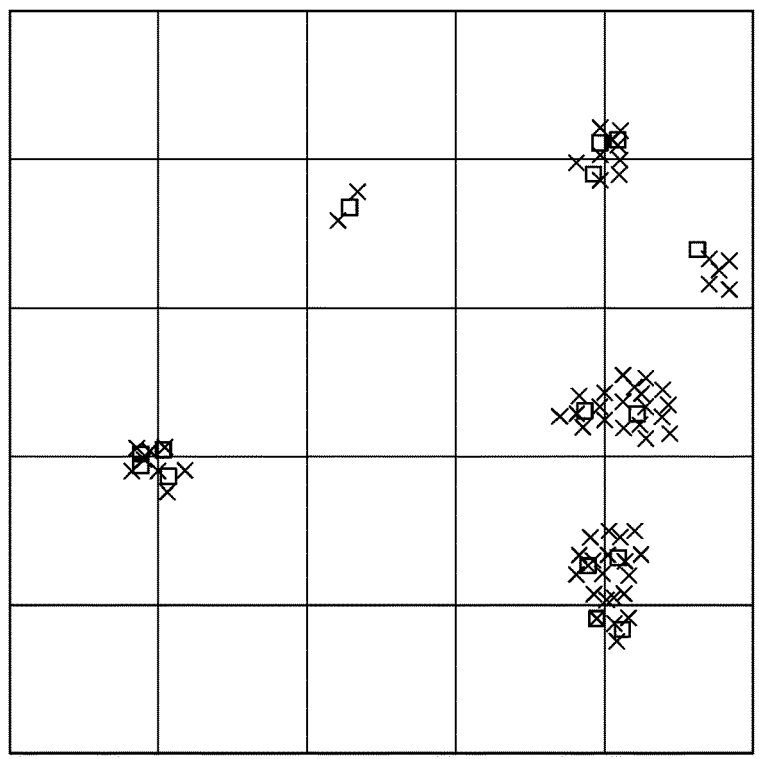

The second of the four approaches/ways to implement the full dynamic solution may be referred to as a mean-of-gridded-color-cluster approach in which pixels or codewords thereof in the input image are first partitioned into multiple (e.g., uniformly, non-uniformly, etc.) non-overlapped partitioned (e.g., relatively small, etc.) cubes or clusters. A mean value can be computed for each cube/cluster. Individually computed mean values for the cubes/clusters—as illustrated in FIG. 3I— may be taken as input to a reshaping function optimization process to generate or obtain optimized values for operational parameters such as MMR or TPB coefficients in forward and backward reshaping functions. The cubes/clusters may be non-empty, occupied by a number of pixel values or codewords where the number is above a minimum number threshold, etc. Example advantages of this approach may include reductions of memory usage and computational cost and complexity.

Figure 3J:
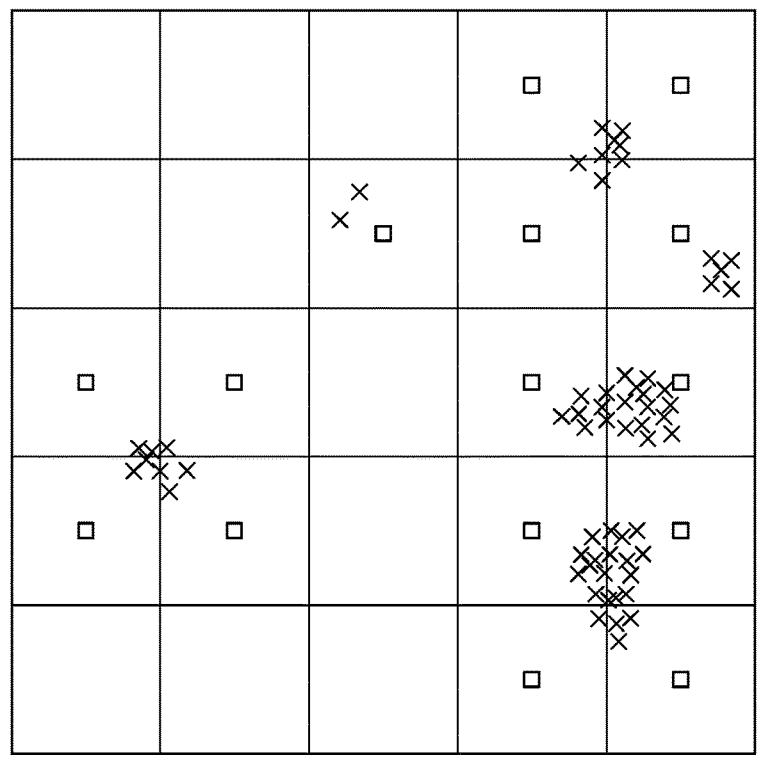

The third of the four approaches/ways to implement the full dynamic solution may be referred to as a center-of-gridded-color-cluster approach. Instead of taking the mean value of each of the cubes or clusters, the center of each of the cubes or clusters—as illustrated in FIG. 3J—may be taken as input to a reshaping function optimization process to generate or obtain optimized values for operational parameters such as MMR or TPB coefficients in forward and backward reshaping functions. As in the case of the second approach, the cubes/clusters in the third approach may be non-empty, occupied by a number of pixel values or codewords where the number is above a minimum number threshold, etc.

Figure 3K:
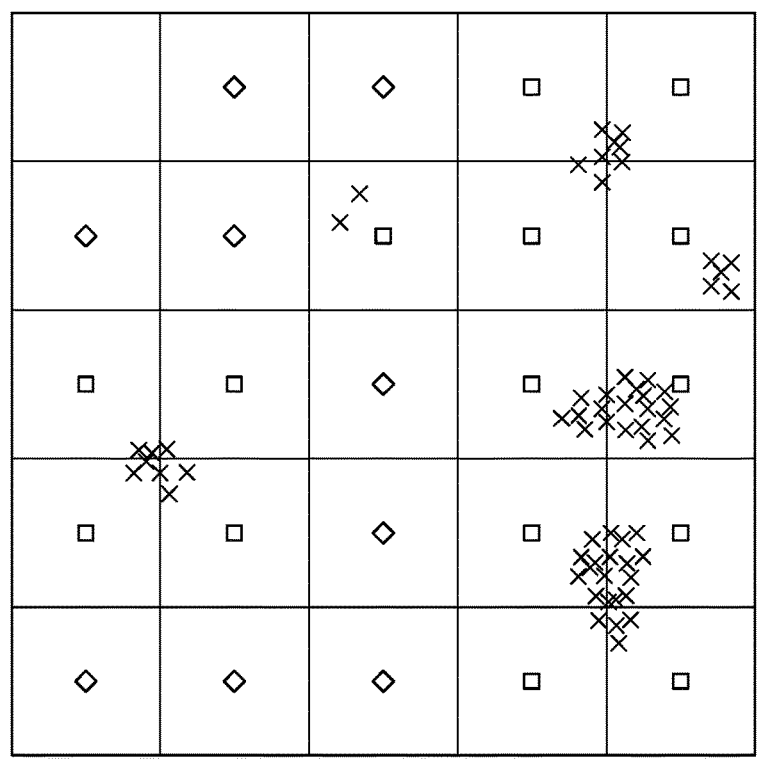

The fourth of the four approaches/ways to implement the full dynamic solution may be referred to as an augmented-center-of-gridded-cluster approach. To alleviate or ameliorate numerical issues relating to a relatively small total number of non-empty cubes or clusters, empty clusters near non-empty clusters may be selected. Centers of the non-empty clusters as well as the empty clusters near the non-empty clusters—as illustrated in FIG. 3K—may be taken as input to a reshaping function optimization process to generate or obtain optimized values for operational parameters such as MMR or TPB coefficients in forward and backward reshaping functions.

Figure 3L:
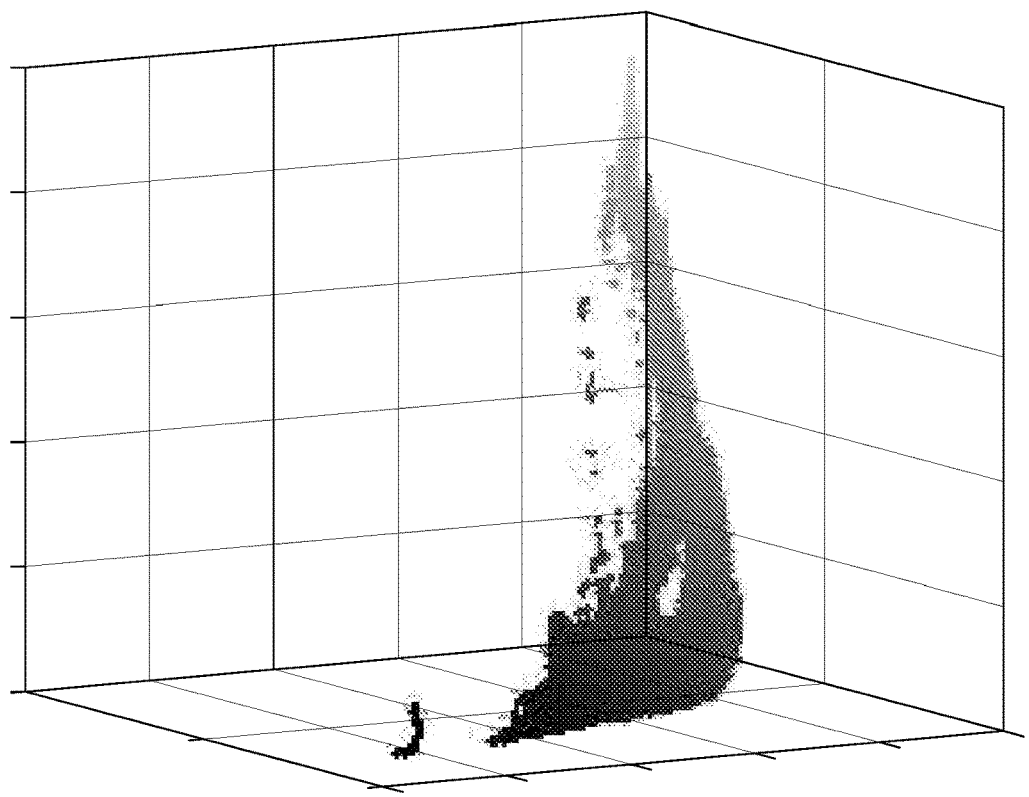

FIG. 3L illustrates an example distribution of pixels or codewords thereof in an input image in a color cube representing an input/original domain or color space.

Figure 3M:
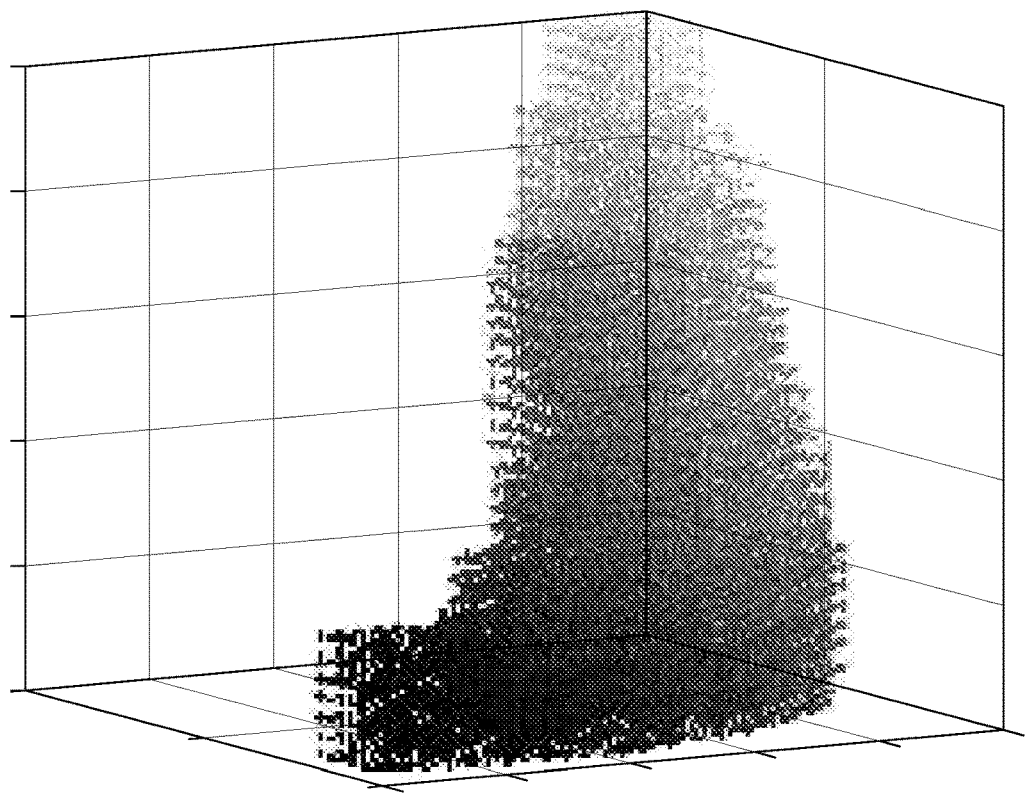

FIG. 3M illustrates example points generated from the distribution of pixels or codewords of FIG. 3L in the input image. In some operational scenarios, additional (data) points—in addition to data points corresponding to non-empty cubes—can be generated for empty neighboring cubes using an augmented center of gridded cluster method. These points generated from the input image can be used as a part of input (e.g., in TPB training, etc.) in an optimization process to generate or obtain optimized values for operational parameters such as MMR or TPB coefficients in forward and backward reshaping functions for the input image.

Figure 3N:
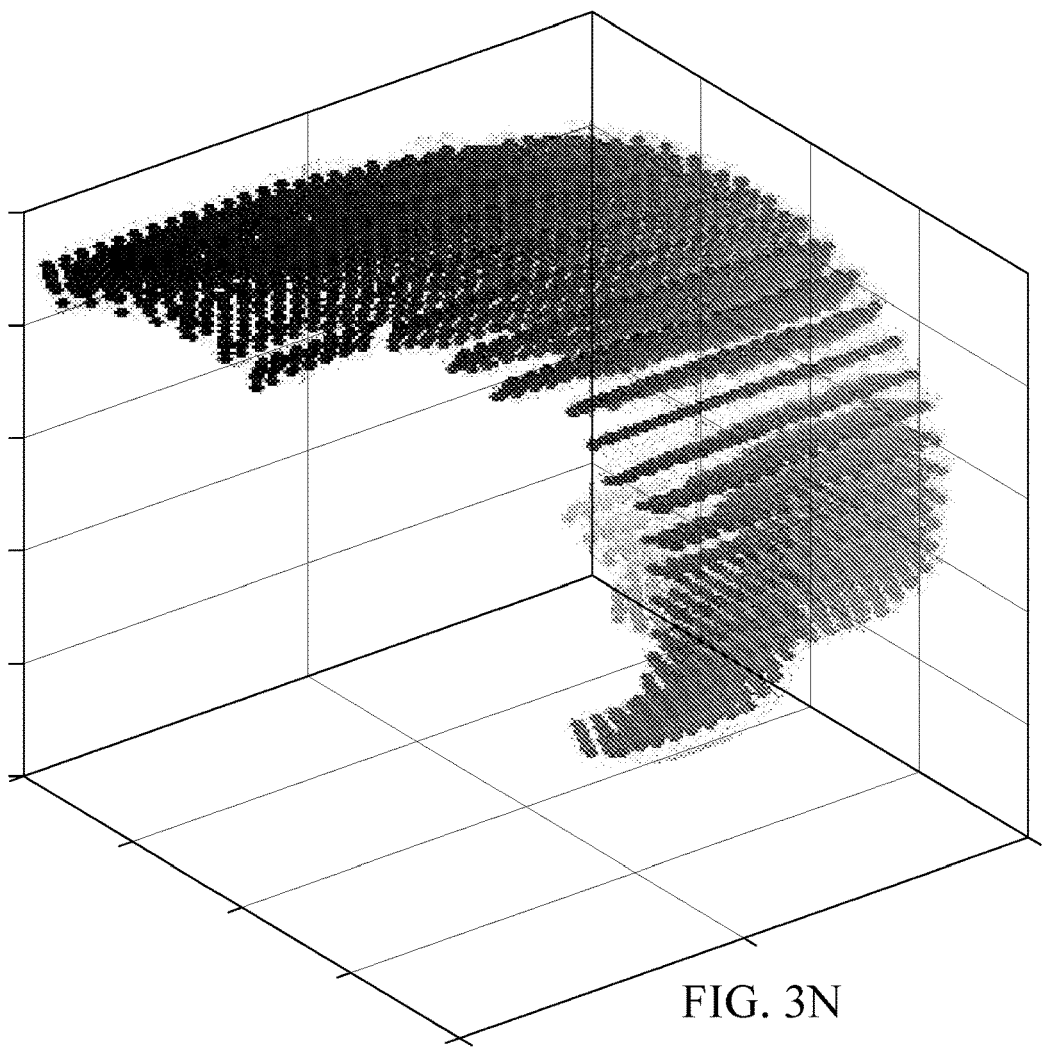

FIG. 3N illustrates example forward transformed points that are transformed from the points of FIG. 3M through wrapped reshaping. These forward transformed points mapped from the points generated from the input image through wrapped reshaping can be used as a part of input (e.g., in TPB training, etc.), along with the points generated from the input image, in the optimization process.

Two-Stage Reshaping

To avoid numerical stability issues that may be encountered in the fully dynamic approach, the two-stage reshaping method may be used. As previously noted, the two-stage reshaping method can include two phases/processes: (1) an offline training phase/process and (2) an online deployment or prediction phase/process.

Primary reshaping (or the second stage) incurs relatively high computational complexity/costs. To help provide or incur the lightest computation in the deployment or prediction phase/process, specific values for some or all operational parameters such as MMR or TPB reshaping coefficients can be trained or generated beforehand offline in the training phase/process and stored as operational parameter datasets in an operational parameter data store accessible by relatively light secondary reshaping (or the first stage) in the deployment or prediction phase/process. The secondary reshaping (the first stage) can be performed in response to receiving an actual input image during the deployment or prediction phase.

As previously noted, in the training phase, primary reshaping functions such as TPB based forward and backward reshaping functions can be trained in two parts: (1) reference mapping creation, and (2) TPB training.

The reference mapping creation involve two control variable sets. The first control variable set relates to a selection of a reference mapping shape or form among different reference mapping shapes or forms—such as donut-like shapes, cylinder shapes, etc. —supported in a wrapped reshaping domain. The first control variable set for shape selection may be denoted as s.

The second control variable set relates to geometric parameters for a given reference mapping shape or form. The geometric parameters determine width, height, and other attributes—such as width w, gap size or extent g, etc. —for the given reference mapping shape or form.

The two control variable sets affect quantization and/or dequantization during forward and backward reshaping or mapping operations, thus prediction accuracy in reconstructing output images.

A plurality of available reference mapping shapes/forms in a reshaped object list (e.g., 206 of FIG. 2A, etc.) may be created, defined or designed in the training phase. Operational parameters represented in the two control variable sets such as (s, w, g) for different reference mapping shapes or forms supported in the reshaped object list (206) can be trained and stored as templates (or operational parameter datasets) in an operational parameter data store in the training phase.

Each template may include a (e.g., distinct, etc.) combination of specific values, as generated in the training process, for the operational parameters in the two control variable sets such as (s, w, g). The combination of specific values in the template may be specifically selected or chosen among multiple combinations or sets of candidate values in the training phase to achieve the best prediction results and generate the least errors in training/testing data in the training phase, for example using a gradient based BESA algorithm/method.

In the deployment or prediction phase, given an input/original image, a specific template may be determined or selected from among the plurality of templates to provide specific values for operational parameters in the primary reshaping. In addition, in the deployment or prediction phase, specific values for operational parameters in the secondary reshaping may be determined or generated at runtime to minimize prediction errors in a (final) reconstructed image depicting the same visual semantic content as the input/original image.

The secondary reshaping as described herein may include applying the following steps of linear scaling to input codewords in the input/original image:

Step 1: given a channel with minimal value (denoted as $v_L$) and maximal value (denoted as $v_H$), scale codewords in the value range $[v_L, v_H]$ to $[0, 1]$.

Step 2: given a scaling factor, x, scale a value range $[0, 1]$ to $$\left[\frac{1-x}{2}, 1-\frac{1-x}{2}\right]$$

It should be noted that a scaling factor x as described herein may scale each channel differently, as each such channel may have a different value range $[v_L, v_H]$. Using scaling factor(s) as described herein, the input/original image in an input video signal can be scaled to generate a scaled image in a scaled signal. The scaled image in the scaled signal can then be fed or provided into the (e.g., MMR, TPB, etc.) primary reshaping.

Prediction errors measuring differences between the reconstructed image and the input/original image may come from two counteracting sources as follows.

First, reshaping or mapping operations—such as implemented with an MMR or TPB algorithm/method—may introduce relatively high reconstruction errors at boundaries of the specific reference or reshaped (forward) shape in a reshaping domain. The smaller the scaling factor/value, the fewer the boundary points are near the boundaries of the specific reference or reshaped (forward) shape. Thus, decreasing the scaling (factor) value can reduce this type of reconstruction error.

Second, quantization errors increase when the scaling factor value is decreased, as multiple input codewords/values from the input/original domain are more likely to be mapped to a single codeword/value in the reshaping domain. Thus, increasing the scaling factor value can reduce this type of error.

An optimized solution (e.g., an optimized value for the scaling factor, etc.) may depend on how a cost function used to measure prediction errors is defined or specified and on assumptions made with the cost function. Additionally, optionally or alternatively, different search algorithms can be developed or used to support or realize different optimization goals.

In some operational scenarios, a separate cost function may be defined for each channel of one or more channels of the input/source domain or color space.

Figure 2E:
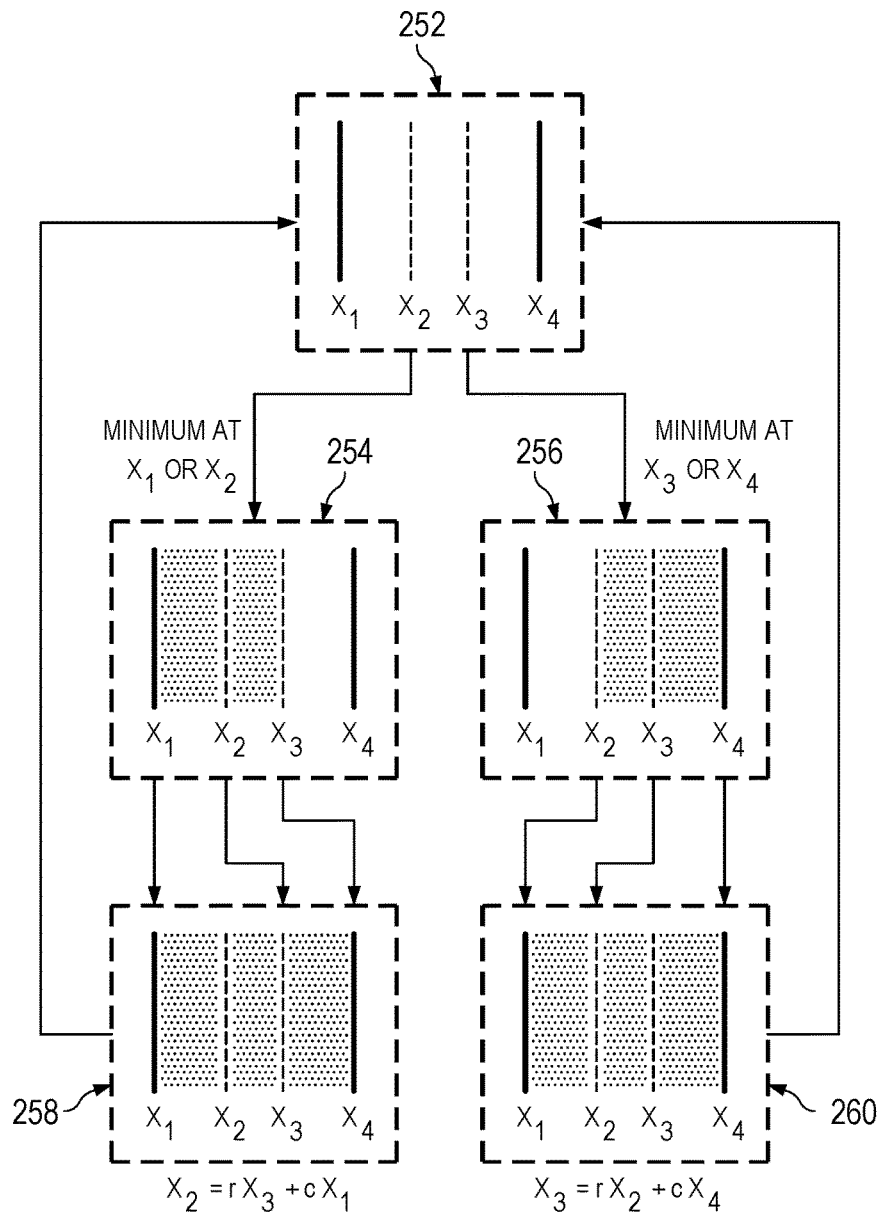

FIG. 2E illustrates an example flow for scaling factor value optimization, for example for a dominant channel in the input/source domain or color space. For the purpose of illustration only, a cost function such as a convex-like function of the scaling factor value may be used in the scaling factor value optimization. It should be noted that the cost function does not have to be a pure or global convex function, but rather may monotonically increase or decrease to a turning point and moving toward the opposite trend afterwards. A relatively fast search algorithm may be used with the cost function to search the best solution or the best scaling factor value.

This optimization problem is to find the optimized scaling factor value to be used together with a selected or specific template in the primary and secondary reshaping to achieve minimum prediction errors in the reconstructed image as compared with the input/original image.

Let a function $f(x)$ of the scaling factor x be the cost function that measures prediction errors generated in the entire process of scaling, forward reshaping, backward reshaping, reverse/inverse scaling, etc.

The optimized scaling factor value $x^{opt}$ may be generated or obtained as a solution to the optimization/minimization problem that minimizes the prediction errors measured by the cost function $f(x)$, as follows:

$$x^{opt} = \arg \min_{x} f(x) \quad (22)$$

In some operational scenarios, the Golden section search algorithm may be applied in expression (22) above to determine the minimum of the cost or error function.

As illustrated in FIG. 2E, block 252 comprises performing an initialization to define a search left boundary X1=0 and a search right boundary X4=1, and computing or generating their corresponding cost/error values F1=$f$(X1) and F4=$f$(X4).

Two interior points {X2} and {X3} may be selected or defined. Cost/error values F2=$f$(X2) and F3=$f$(X3) corresponding to the interior points {X2} and {X3} are also computed or generated.

The interior point {X2} may be selected or defined between X1 and X4 to satisfy the following relationship:

$$\frac{X2 - X1}{X4 - X2} = \frac{X4 - X2}{X4 - X1} \quad (23)$$

The interior point {X3} may be selected or defined between X1 and X4 to satisfy the following relationship:

$$\frac{X3 - X2}{X4 - X3} = \frac{X4 - X3}{X4 - X2} \quad (24)$$

The cost/error values for these four points in between X1 and X4 may be used to determine whether a convergence/exit criterium is satisfied and/or where the optimized scaling factor value can be found to satisfy the convergence/exit criterium.

In some operational scenarios, the convergence/exit criterium is satisfied if the following condition is true:

abs($F4-F1$)<$B$, where $B$ is a positive constant/threshold (25)

In response to determining that the convergence/exit criterium in expression (25) is satisfied, the minimal cost/error value is identified or selected from among the cost/error values for the four points {X1, X2, X3, X4}. The point corresponding to the minimal cost/error value is generated or obtained as the optimized solution. The process flow ends or exits.

In response to determining that the convergence/exit criterium in expression (25) is not satisfied, it is determined among the four points {X1, X2, X3, X4} whether the minimal cost/error (function) value among their corresponding cost/error values belongs to point X1 or X2 (or otherwise belongs to point X3 or X4).

In response to determining that the minimal cost/error (function) value among their corresponding cost/error values belongs to point X1 or X2, the process flow goes to block 254 for the next iteration. In the next iteration, the three point {X1, X2, X3} are reused; X2 becomes the new point X3; X3 becomes the new point X4. Further, block 258 comprises generating a new point X2 based on expression (23) above. The process flow then goes back to block 252.

Otherwise, in response to determining that the minimal cost/error (function) value among their corresponding cost/error values belongs to point X3 or X4, the process flow goes to block 256 for the next iteration. In the next iteration, the three point {X2, X3, X4} are reused; X2 becomes the new point X1; X3 becomes the new point X2. Further, block 260 comprises generating a new point X3 based on expression (24) above. The process flow then goes back to block 252.

In some operational scenarios, a cross-color-channel cost function may be defined for one or more channels of the input/source domain or color space.

Figure 2F:
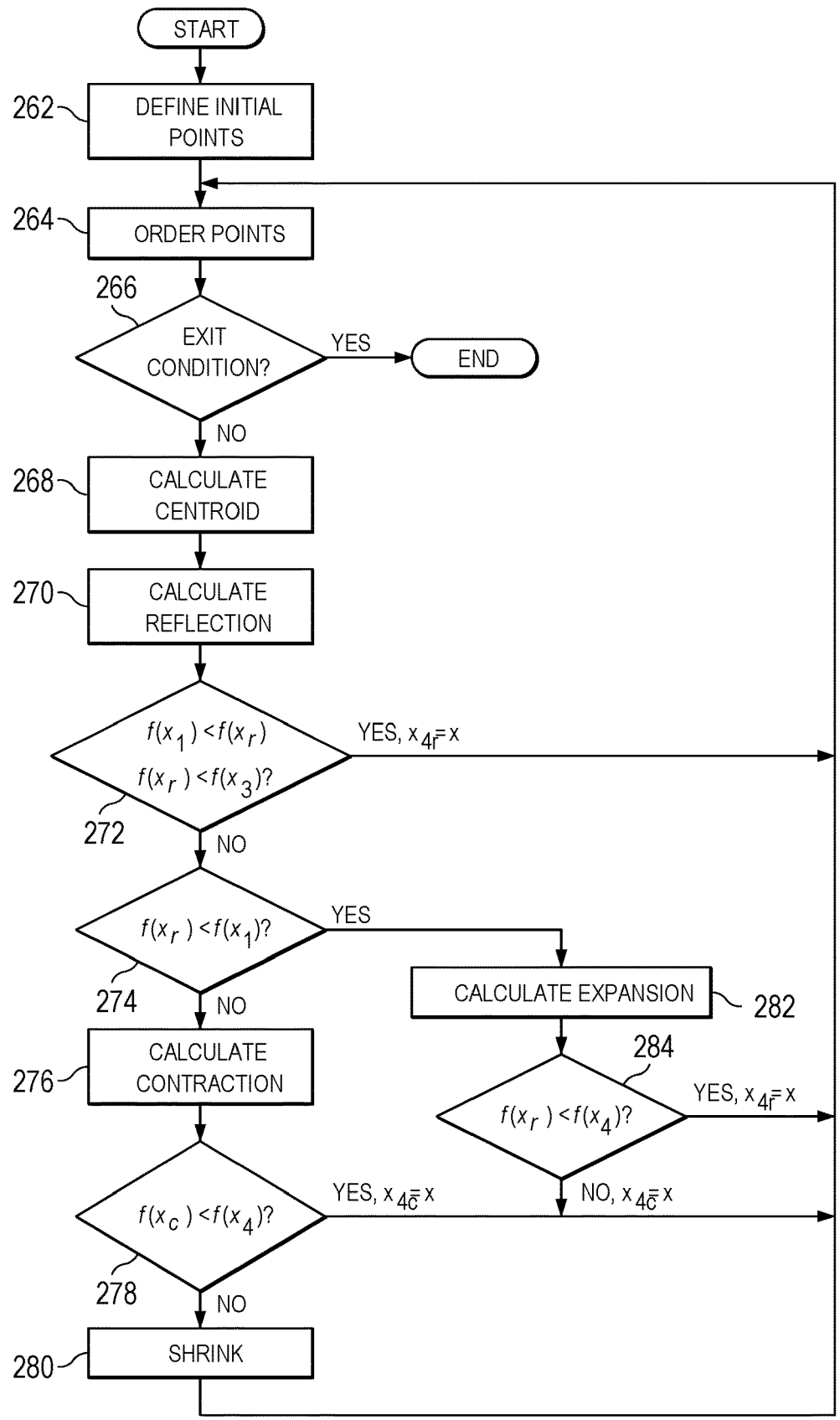

FIG. 2F illustrates an example flow for scaling factor value optimization, for example for three color channels in the input/source domain or color space. A cost function—which may or may not be a convex function—may be used in the scaling factor value optimization.

This optimization problem is to find the optimized scaling factor value to be used together with a selected or specific template in the primary and secondary reshaping to achieve minimum prediction errors in the reconstructed image as compared with the input/original image.

Let a function $f(x_1, x_2, x_3)$ of three scaling factors $x_1$, $x_2$, $x_3$ be the cost function that measures prediction errors generated in the entire process of scaling, forward reshaping, backward reshaping, reverse/inverse scaling, etc.

The optimized scaling factor value $x^{opt}$ may be generated or obtained as a solution to the optimization/minimization problem that minimizes the prediction errors measured by the cost function $f(x_1, x_2, x_3)$, as follows:

$$x_1^{opt}, x_2^{opt}, x_3^{opt} = \arg \min_{x_1, x_2, x_3} f(x_1, x_2, x_3) \quad (26)$$

In some operational scenarios, the Nelder-Mead algorithm may be applied in expression (26) above to determine the minimum of the cost or error function.

Block 262 of FIG. 2F comprises initializing four initial points of the scaling factor represented respectively by four vectors: $x_1^{(o)}$=(0.3,0.3,0.3), $x_2^{(o)}$=(0.3,0.3,1), $x_3^{(o)}$=(0.3,1,1), and $x_4^{(o)}$=(1,1,1).

Block 264 comprising sorting or ordering these four points {$x_1^{(o)}$, $x_2^{(o)}$, $x_3^{(o)}$, $x_4^{(o)}$} according to their cost/error (function) values and rename these point following the order of the cost/error (function) values as {$x_1$, $x_2$, $x_3$, $x_4$} such that:

$$f(x_4) \geq f(x_3) \geq f(x_2) \geq f(x_1) \quad (27)$$

Block 266 comprises determining whether a convergence/exit criterium is satisfied. In some operational scenarios, the convergence/exit criterium is satisfied if the following condition is true:

$$|f(x_4)-f(x_1)|<Th \quad (28)$$

where Th denotes a preset or dynamically configurable threshold value such as 100, 50, etc.

In response to determining that the convergence/exit criterium in expression (28) is satisfied, the minimal cost/error value is identified or selected from among the cost/error values for the four points $\{x_1, x_2, x_3, x_4\}$. The point corresponding to the minimal cost/error value is generated or obtained as the optimized solution. The process flow ends or exits.

Block 268 comprises, in response to determining that the convergence/exit criterium in expression (28) is not satisfied, calculating the centroid point of $x_1$, $x_2$, and $x_3$ points. Denote this centroid point as $x_0$, as follows:

$$x_0 = \frac{x_1+x_2+x_3}{3} \quad (29)$$

Block 270 comprises computing a reflection point of $x_4$ as $x_r$, as follows:

$$x_r = x_0 + (x_0 - x_4) \quad (30)$$

Block 272 comprises determining whether the reflects point $x_r$ is better than (in terms of prediction error) the second worst point ($x_3$) in the present example but not the best point ($x_1$), or $$f(x_3)>f(x_r)>f(x_1) \quad (31)$$

In response to determining that the reflects point $x_r$ is better than the second worst point ($x_3$), the process flow goes to block 264 with $x_4=x_r$. Otherwise, the process flow goes to block 274.

Block 274 comprises determining whether the reflected point error value is better than the best point ($x_1$), as follows:

$$f(x_1)>f(x_r) \quad (32)$$

Block 282 comprises, in response to determining that the reflected point error value is better than the best point ($x_1$), computing an expansion point $x_e$ as follows:

$$x_e = x_0 + 2(x_r - x_0) \quad (33)$$

Block 284 comprises determining whether the expanded point is better than the reflected point, as follows:

$$f(x_r)>f(x_e) \quad (34)$$

In response to determining that the expanded point is better than the reflected point, the process flow goes to block 264 with $x_4=x_e$. Otherwise, in response to determining that the expanded point is not better than the reflected point, the process flow goes to block 264 with $x_4=x_r$.

Block 276 comprises, in response to determining that the reflected point error value is not better than the best point ($x_1$), computing a contracted point $x_c$ as follows:

$$x_c = x_0 + 0.5(x_4 - x_0) \quad (35)$$

Block 278 comprises determining whether the contracted point is better than the worst point, as follows:

$$f(x_4)>f(x_c) \quad (36)$$

In response to determining that the contracted point is better than the worst point, the process flow goes to block 264 with $x_4=x_c$.

Block 280 comprises, in response to determining that the contracted point is not better than the worst point, shrinking (candidate) points by replacing all points excepts the best ($x_1$), as follows:

$$x_i = x_i + 0.5(x_i - x_1) \text{ for } i=2,3,4 \quad (37)$$

The process flow then goes to block 264 with these replaced points.

Truncated Field Transform

Wrapped reshaping as described herein can map or reshape an input image from a (e.g., linear, perceptual, etc.) high bit depth domain or color space into a (e.g., linear, perceptual, etc.) lower bit depth wrapped non-linear reshaping domain or color space. However, the wrapped domain with its non-linearity may make it difficult or even impossible to perform (e.g., commonly used, etc.) image processing algorithms or operations. To resolve this issue, a truncated field transform may be designed and used to convert the wrapped domain into a truncated transform domain such as a linear domain in which these image processing algorithms or operations can be performed. In some operational scenarios, the truncated field transform allows neighboring codeword values in an input domain before wrapping to remain as neighboring codeword values in the truncated transform domain.

For different target (e.g., reference, reshaped, etc.) shapes or forms, different truncated field transforms may be designed or used to ensure the image processing algorithms or operations from generating codeword values outside selected target shapes or forms. can maintain inside the range.

For the purpose of illustration only, truncated field transforms may be applied to a cylinder shape as an example target shape or form used for wrapped reshaping. It should be noted that, in various other embodiments, some or all techniques relating to truncated field transforms can be applied to other target shapes or forms other than the cylinder shape.

Let b denote a bit depth (e.g., 8 bits, etc.) of a wrapped non-linear reshaping domain. Let $(\hat{x}, \hat{y}, \hat{z})$ denote coordinate values representing a point in the (e.g., 8-bit, etc.) reshaping domain. A forward truncated field transform (or simply truncated field transform) can convert this point (e.g., in 8-bit integer precision, etc.) from the reshaping domain to a truncated field domain as $(\hat{x}', \hat{y}', \hat{z}')$ (e.g., in 32 or 64 floating point or double precision, etc.).

As used herein, a truncated field domain is transformed by a truncated field transform from a reference or reshaped shape or form with wrapped axis and is transformed back by an inverse truncated field transform into the reference or reshaped shape or form. Image processing operations such as those designed or implemented for a linear or non-linear domain (without the wrapped axis) may be applied as intended to generate processed image data in the truncated field domain. Additionally, optionally or alternatively, clipping operations may be performed on the processed image data in the truncated field domain to avoid or prevent new image data values generated from the image processing operations from spilling out of boundary of the reference or reshaped shape or shape transformed back by the inverse truncated field transform.

A common variable may be computed first, which may represent a distance to the center of the cylinder shape as follows:

$$\hat{d} = \sqrt{\left(\frac{\hat{y}}{2^b} - 0.5\right)^2 + \left(\frac{\hat{z}}{2^b} - 0.5\right)^2} \tag{38}$$

Depending on specific locations or values of ŷ and ẑ, the following eight (8) cases may be separately considered:

If $\frac{\hat{y}}{2^b} - 0.5 \geq 0$ and $\frac{\hat{z}}{2^b} - 0.5 \geq 0$ and $\left|\frac{\hat{z}}{2^b} - 0.5\right| \geq \left|\frac{\hat{y}}{2^b} - 0.5\right|$ $$\hat{z}' = 2\pi + \mathrm{acos}\left(\frac{\left|\frac{|\hat{z}|}{2^b} - 0.5\right|}{\hat{d}}\right) \tag{39-1}$$

$$\hat{y}' = \hat{y} \tag{39-2}$$

$$\hat{x}' = \hat{x} \tag{39-3}$$

If $\frac{\hat{y}}{2^b} - 0.5 \geq 0$ and $\frac{\hat{z}}{2^b} - 0.5 < 0$ and $\left|\frac{\hat{z}}{2^b} - 0.5\right| < \left|\frac{\hat{y}}{2^b} - 0.5\right|$ $$\hat{z}' = 2\pi + \mathrm{asin}\left(\frac{\left|\frac{|\hat{y}|}{2^b} - 0.5\right|}{\hat{d}}\right) \tag{40-1}$$

$$\hat{y}' = \hat{y} \tag{40-2}$$

$$\hat{x}' = \hat{x} \tag{40-3}$$

If $\frac{\hat{y}}{2^b} - 0.5 \geq 0$ and $\frac{\hat{z}}{2^b} - 0.5 \geq 0$ and $\left|\frac{\hat{z}}{2^b} - 0.5\right| \geq \left|\frac{\hat{y}}{2^b} - 0.5\right|$ $$\hat{z}' = \pi - \mathrm{asin}\left(\frac{\left|\frac{|\hat{y}|}{2^b} - 0.5\right|}{\hat{d}}\right) \tag{41-1}$$

$$\hat{y}' = \hat{y} \tag{41-2}$$

$$\hat{x}' = \hat{x} \tag{41-3}$$

If $\frac{\hat{y}}{2^b} - 0.5 \geq 0$ and $\frac{\hat{z}}{2^b} - 0.5 \geq 0$ and $\left|\frac{\hat{z}}{2^b} - 0.5\right| < \left|\frac{\hat{y}}{2^b} - 0.5\right|$ $$\hat{z}' = \pi - \mathrm{acos}\left(\frac{\left|\frac{|\hat{z}|}{2^b} - 0.5\right|}{\hat{d}}\right) \tag{42-1}$$

$$\hat{y}' = \hat{y} \tag{42-2}$$

$$\hat{x}' = \hat{x} \tag{42-3}$$

If $\frac{\hat{y}}{2^b} - 0.5 < 0$ and $\frac{\hat{z}}{2^b} - 0.5 \geq 0$ and $\left|\frac{\hat{z}}{2^b} - 0.5\right| \geq \left|\frac{\hat{y}}{2^b} - 0.5\right|$ $$\hat{z}' = \pi + \mathrm{acos}\left(\frac{\left|\frac{|\hat{z}|}{2^b} - 0.5\right|}{\hat{d}}\right) \tag{43-1}$$

$$\hat{y}' = \hat{y} \tag{43-2}$$

$$\hat{x}' = \hat{x} \tag{43-3}$$

If $\frac{\hat{y}}{2^b} - 0.5 < 0$ and $\frac{\hat{z}}{2^b} - 0.5 \geq 0$ and $\left|\frac{\hat{z}}{2^b} - 0.5\right| < \left|\frac{\hat{y}}{2^b} - 0.5\right|$ $$\hat{z}' = \pi + \mathrm{asin}\left(\frac{\left|\frac{|\hat{y}|}{2^b} - 0.5\right|}{\hat{d}}\right) \tag{44-1}$$

$$\hat{y}' = \hat{y} \tag{44-2}$$

$$\hat{x}' = \hat{x} \tag{44-3}$$

If $\frac{\hat{y}}{2^b} - 0.5 < 0$ and $\frac{\hat{z}}{2^b} - 0.5 < 0$ and $\left|\frac{\hat{z}}{2^b} - 0.5\right| < \left|\frac{\hat{y}}{2^b} - 0.5\right|$ $$\hat{z}' = 2\pi - \mathrm{asin}\left(\frac{\left|\frac{|\hat{y}|}{2^b} - 0.5\right|}{\hat{d}}\right) \tag{45-1}$$

$$\hat{y}' = \hat{y} \tag{45-2}$$

$$\hat{x}' = \hat{x} \tag{45-3}$$

If $\frac{\hat{y}}{2^b} - 0.5 < 0$ and $\frac{\hat{z}}{2^b} - 0.5 < 0$ and $\left|\frac{\hat{z}}{2^b} - 0.5\right| \geq \left|\frac{\hat{y}}{2^b} - 0.5\right|$ $$\hat{z}' = 2\pi - \mathrm{acos}\left(\frac{\left|\frac{|\hat{z}|}{2^b} - 0.5\right|}{\hat{d}}\right) \tag{46-1}$$

$$\hat{y}' = \hat{y} \tag{46-2}$$

$$\hat{x}' = \hat{x} \tag{46-3}$$

where a cos( ) denotes arccosine function; a sin( ) denotes arcsine function. The truncated field transform in expressions (38) through (46) above allows neighboring codeword values in the input domain before wrapping into the cylinder shape to remain as neighboring codeword values in the truncated transform domain converted by the truncated field transform from the cylinder shape.

After applying the forward truncated field transform to convert points in the wrapped reshaping domain to corresponding points in the truncated field domain, image processing operations (e.g., 116 of FIG. 1, etc.) such as filtering (e.g., averaging filtering, etc.) may be performed on the corresponding points in the truncated field domain to generate processed points in the truncated field domain. In some operational scenarios, the points in the truncated field domain may be represented by codeword values in floating point or double precision to avoid or reduce any information lost.

After finishing the image processing operations, the processed points can be converted back to the wrapped reshaping domain using backward or inverse truncated field transform, as follows:

$$\hat{y} = \left(0.5 - \hat{y}'\sin\left(\hat{z}' - \frac{\pi}{2}\right)\right)2^b \tag{47-1}$$

$$\hat{z} = \left(0.5 - \hat{y}'\cos\left(\hat{z}' + \frac{\pi}{2}\right)\right)2^b \tag{47-2}$$

$$\hat{x} = \hat{x}' \tag{47-3}$$

In some operational scenarios, some processed points generated in the truncated field domain by the image processing operations may correspond to points—in a visualization color cube used to host the non-linear wrapping domain or the target shape or form—outside the target shape or form representing the non-linear wrapping domain. These points (in the visualization color space) outside the target shape or form can be clipped to ensure that the points are constrained or reside within the target shape or form.

For the purpose of illustration only, the target shape or form is the same cylinder shape as in the previous example. Given w as a cylinder width of the cylinder shape and b as a bit depth of the reshaping domain, a distance to the center of the cylinder shape may be computed as follows:

$$\hat{d} = \sqrt{\left(\frac{\hat{y}}{2^b} - 0.5\right)^2 + \left(\frac{\hat{z}}{2^b} - 0.5\right)^2} \quad (48)$$

Three different cases may be considered for clipping operations, as follows:

For $\forall(\hat{x}, \hat{y}, \hat{z})$ for which $\hat{d} < (0.5-w)$:

$$\hat{y} = 2^b \left( \frac{\left(\frac{\hat{y}}{2b} - 0.5\right)}{\hat{d}} \frac{(1-2w)}{2} + 0.5 \right) \quad (49\text{-}1)$$

$$\hat{z} = 2^b \left( \frac{\left(\frac{\hat{z}}{2b} - 0.5\right)}{\hat{d}} \frac{(1-2w)}{2} + 0.5 \right) \quad (49\text{-}2)$$

$$\hat{x} = \hat{x} \quad (49\text{-}3)$$

For $\forall(\hat{x}, \hat{y}, \hat{z})$ for which $\hat{d} > 0.5$:

$$\hat{y} = 2^b \left( \frac{\left(\frac{\hat{y}}{2^b} - 0.5\right)}{2\hat{d}} + 0.5 \right) \quad (50\text{-}1)$$

$$\hat{z} = 2^b \left( \frac{\left(\frac{\hat{z}}{2^b} - 0.5\right)}{2\hat{d}} + 0.5 \right) \quad (50\text{-}2)$$

$$\hat{x} = \hat{x} \quad (50\text{-}3)$$

Else $$\hat{x}=\hat{x}, \hat{y}=\hat{y}, \hat{z}=\hat{z} \quad (51)$$

Example Process Flows

Figure 4A:
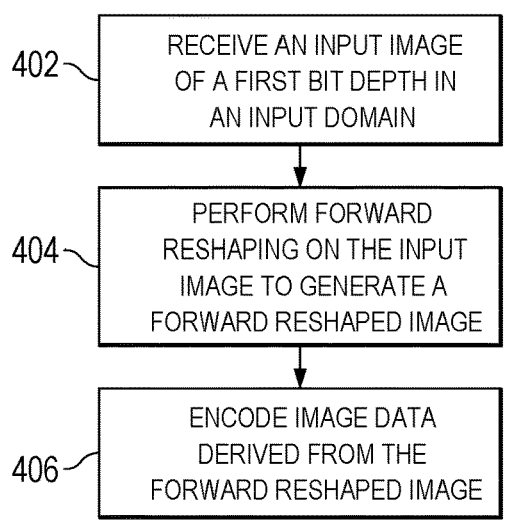

FIG. 4A illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, an image processing system receives an input image of a first bit depth in an input domain from an input video signal of the first bit depth, the first bit depth being higher than a second bit depth in a reshaping domain.

In block 404, the image processing system performs forward reshaping operations on the input image to generate a forward reshaped image of the second bit depth in the reshaping domain, the forward reshaping operations including wrapping input codewords in the input image along a non-wrapped axis of the input domain into reshaped codewords in the forward reshaped image in a wrapped axis of the reshaping domain.

In block 406, the image processing system encodes, into an output video signal of the second bit depth, an image container containing image data derived from the forward reshaped image, the image data in the image container causing a recipient device of the output video signal to construct a backward reshaped image of a third bit depth for rendering on a display device, the third bit depth being higher than the second bit depth.

In an embodiment, the image processing system is further configured to perform: applying a forward truncated field transform to the forward reshaped image to generate an intermediate image in a truncated field domain; performing one or more image processing operations on the intermediate image to generate a processed intermediate image; applying an inverse truncated field transform to the processed intermediate image to generate the image data in the image container.

In an embodiment, the processed intermediate image includes one or more clipped codeword values generated from clipping operations to ensure all codeword values in the processed intermediate image to be within a target spatial shape representing the reshaping domain.

In an embodiment, the second bit depth represents one of: 8 bits, 10 bits, 12 bits, or another number of bits lower than the first bit depth.

In an embodiment, the forward reshaping operations are based on a set of forward reshaping mappings; a set of operational parameter values used in the set of forward reshaping mappings is selected, based at least in part on input codewords in the input image, from among a plurality of sets of operational parameter values; each set of operational parameters in the plurality of sets of operational parameter values is optimized to minimize predictions errors for a respective training image cluster among a plurality of training image clusters.

In an embodiment, the set of forward reshaping mappings includes one or more of: multivariate multiple regression (MMR) mappings, tensor product B-spline (TPB) mappings, forward reshaping lookup tables (FLUTs), or other types of forward reshaping mappings.

In an embodiment, each set of operational parameters in the plurality of sets of operational parameter values is generated based on a backward error subtraction for signal adjustment (BESA) algorithm.

In an embodiment, input codewords in the input image are scaled with one or more scaling factors; the one or more scaling factors are optimized at runtime using a search algorithm based on one or more of: a Golden section algorithm, a Nelder-Mead algorithm, or another search algorithm.

In an embodiment, an input reshape representing the input domain is mapped, using a set of mapping functions, to a target reference shape representing the reshaping domain; the target reference shape is selected, based at least in part on a distribution of input codewords in the input image, from among a plurality of different reference shapes corresponding to a plurality of different candidate reshaping domains.

In an embodiment, the plurality of different reference shapes comprises: at least one of: a complete geometric shape, a complete geometric shape inserted with a single gap portion, a complete geometric shape inserted with multiple gap portions, a donut shape, a cylinder shape, a torus shape, another shape homomorphic to a cube, or another shape non-homomorphic to a cube.

In an embodiment, the input domain represents one of: an RGB color space, a YCbCr color space, a perceptual quantized color space, a linear color space, or another color space.

In an embodiment, the first bit depth represents one of: 12 bits, 16 or more bits, or another number of bits higher than the second bit depth.

Figure 4B:
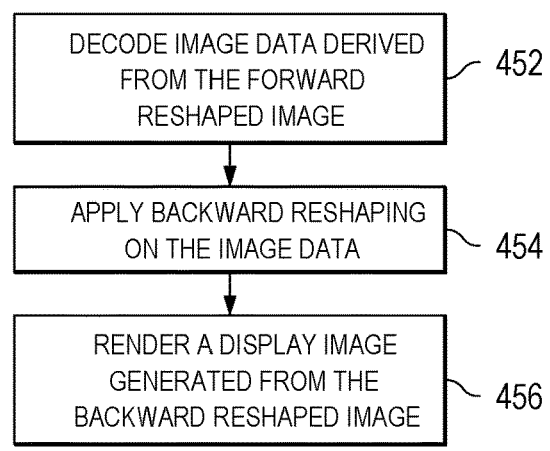
Figure 5:
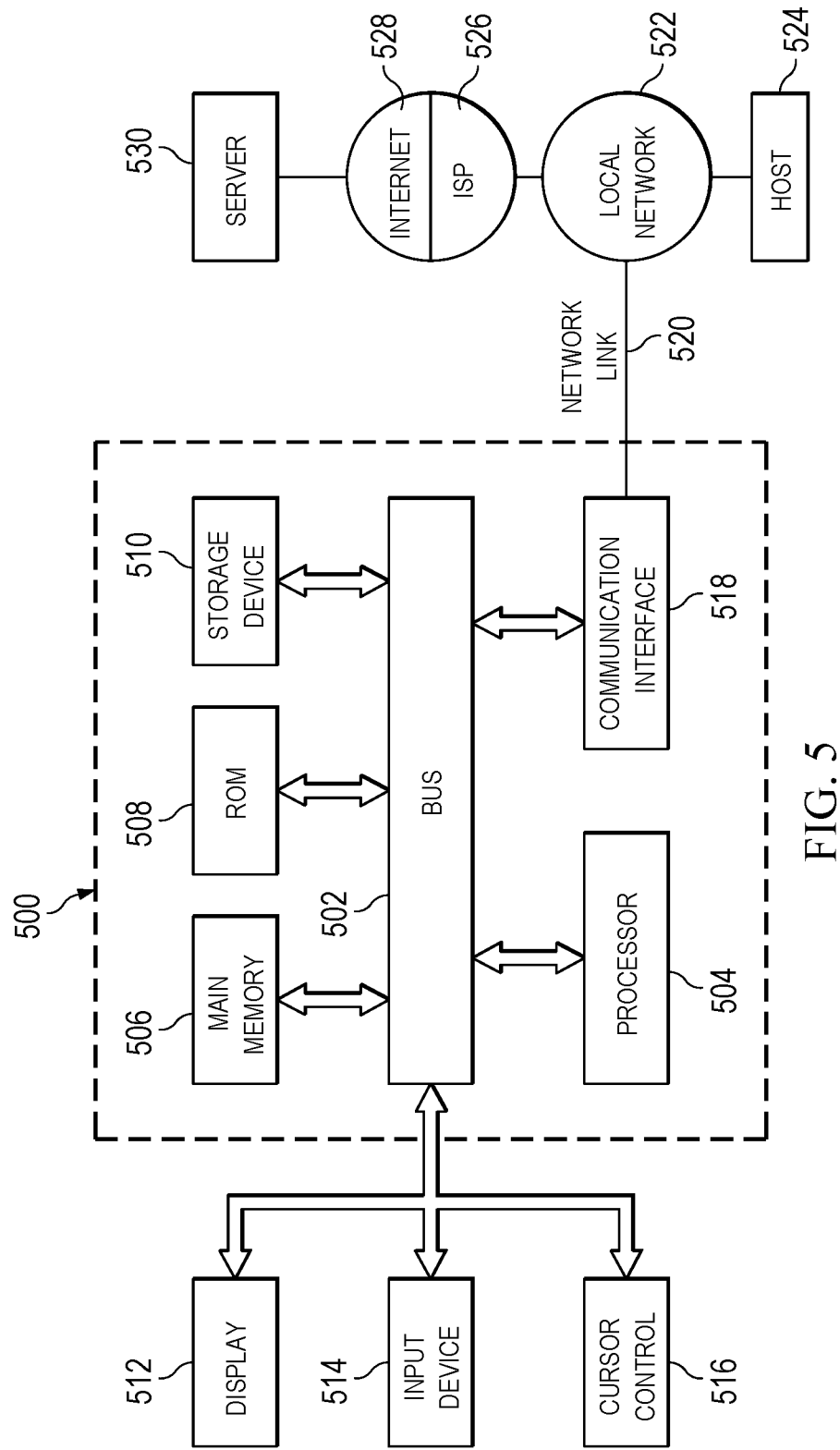

FIG. 4B illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 452, an image processing system decodes, from a video signal, an image container containing image data derived from a forward reshaped image in a reshaping domain, a source image of a first bit depth in a source domain having been forward reshaped to generate the forward reshaped image in a second bit depth lower than the first bit depth.

In block 454, the image processing system applies backward reshaping operations on the image data decoded from the video signal to generate a backward reshaped image in a target domain, the backward reshaped image being of a third bit depth higher than the second bit depth, the backward reshaping operations including unwrapping codewords in the image data along a wrapped axis of the reshaping domain into backward reshaped codewords in the backward reshaped image in a non-wrapped axis of the target domain.

In block 456, the image processing system renders, on a display device, a display image generated from the backward reshaped image.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of embodiments of the present invention.

EEE 1. A method comprising:
receiving an input image of a first bit depth in an input domain from an input video signal of the first bit depth, the first bit depth being higher than a second bit depth in a reshaping domain;
performing forward reshaping operations on the input image to generate a forward reshaped image of the second bit depth in the reshaping domain, the forward reshaping operations including wrapping input codewords in the input image along a non-wrapped axis of the input domain into reshaped codewords in the forward reshaped image in a wrapped axis of the reshaping domain;

encoding, into an output video signal of the second bit depth, an image container containing image data derived from the forward reshaped image, the image data in the image container causing a recipient device of the output video signal to construct a backward reshaped image of a third bit depth for rendering on a display device, the third bit depth being higher than the second bit depth.

EEE 2. The method of EEE 1, wherein the wrapped axis of the reshaping domain has a geometric shape different from the non-wrapped axis; wherein a total number of available codewords on the wrapped axis is more than a total number of available codewords on the non-wrapped axis EEE 3. The method of EEE 1 or 2, further comprising:
applying a forward truncated field transform to the forward reshaped image to generate an intermediate image in a truncated field domain;
performing one or more image processing operations on the intermediate image to generate a processed intermediate image;
applying an inverse truncated field transform to the processed intermediate image to generate the image data in the image container.

EEE 4. The method of EEEs 1-3, wherein the processed intermediate image includes one or more clipped codeword values generated from clipping operations to ensure all codeword values in the processed intermediate image to be within a target spatial shape representing the reshaping domain.

EEE 5. The method of any of EEEs 1-4, wherein the second bit depth represents one of: 8 bits, 10 bits, 12 bits or another number of bits lower than the first bit depth.

EEE 6. The method of any of EEEs 1-5, wherein the forward reshaping operations are based on a set of forward reshaping mappings; wherein a set of operational parameter values used in the set of forward reshaping mappings is selected, based at least in part on input codewords in the input image, from among a plurality of sets of operational parameter values; wherein each set of operational parameters in the plurality of sets of operational parameter values is optimized to minimize predictions errors for a respective training image cluster among a plurality of training image clusters.

EEE 7. The method of EEE 6, wherein the set of forward reshaping mappings includes one or more of: multivariate multiple regression (MMR) mappings, tensor product B-spline (TPB) mappings, forward reshaping lookup tables (FLUTs), or other types of forward reshaping mappings.

EEE 8. The method of EEE 6 or 7, wherein each set of operational parameters in the plurality of sets of operational parameter values is generated based on a backward error subtraction for signal adjustment (BESA) algorithm.

EEE 9. The method of EEE 8, wherein prediction errors propagated in the BESA algorithm are computed based at least in part on (a) differences between input values and reconstructed values and (b) spatial gradients derived as partial derivatives of a cross-channel forward reshaping function used for generating the reconstructed values.

EEE 10. The method of any of EEEs 1-9, wherein input codewords in the input image are scaled with one or more scaling factors; wherein the one or more scaling factors are optimized at runtime using a search algorithm based on one or more of: a Golden section algorithm, a Nelder-Mead algorithm, or another search algorithm.

EEE 11. The method of any of EEEs 1-10, wherein an input reshape representing the input domain is mapped, using a set of mapping functions, to a target reference shape representing the reshaping domain; wherein the target reference shape is selected, based at least in part on a distribution of input codewords in the input image, from among a plurality of different reference shapes corresponding to a plurality of different candidate reshaping domains.

EEE 12. The method of EEE 11, wherein the plurality of different reference shapes comprises: at least one of: a complete geometric shape, a complete geometric shape inserted with a single gap portion, a complete geometric shape inserted with multiple gap portions, a donut shape, a cylinder shape, a torus shape, another shape homomorphic to a cube, or another shape non-homomorphic to a cube.

EEE 13. The method of any of EEEs 1-12, wherein the input domain represents one of: an RGB color space, a YCbCr color space, a perceptual quantized color space, a linear color space, or another color space.

EEE 14. The method of any of EEEs 1-13, wherein the first bit depth represents one of: 12 bits, 16 or more bits, or another number of bits higher than the second bit depth.

EEE 15. The method of any of EEEs 1-14, wherein the forward reshaping operations represent primary reshaping operations; the method further comprising: performing secondary reshaping operations on the input image to linearly scale a limited input data range to a full data range for each color channel, wherein the secondary reshaping operations include one or more of: per-channel pre-reshaping or scaling.

EEE 16. The method of EEE 15, wherein image metadata is generated based on operational parameters used in the primary reshaping operations and the secondary reshaping operations; wherein the image metadata is provided in the output video signal of the second bit depth to the recipient device.

EEE 17. The method of any of EEEs 1-16, wherein the secondary reshaping operations are performed in a first stage preceding a second stage in which the primary reshaping operations are performed.

EEE 18. The method of any of EEEs 1-17, wherein a combination of the secondary reshaping operations and the primary reshaping operations is performed at runtime in a single combined stage.

EEE 19. The method of any of EEEs 1-18, wherein the reshaping domain is represented by a torus shape.

EEE 20. The method of any of EEE s 1-19, wherein the reshaping domain is represented by a cylinder shape.

EEE 21. A method comprising:
decoding, from a video signal, an image container containing image data derived from a forward reshaped image in a reshaping domain, a source image of a first bit depth in a source domain having been forward reshaped to generate the forward reshaped image in a second bit depth lower than the first bit depth;
applying backward reshaping operations on the image data decoded from the video signal to generate a backward reshaped image in a target domain, the backward reshaped image being of a third bit depth higher than the second bit depth, the backward reshaping operations including unwrapping codewords in the image data along a wrapped axis of the reshaping domain into backward reshaped codewords in the backward reshaped image in a non-wrapped axis of the target domain;

rendering, on a display device, a display image generated from the backward reshaped image.

EEE 22. An apparatus comprising a processor and configured to perform any one of the methods recited in EEEs 1-21.

EEE 23. A non-transitory computer-readable storage medium having stored thereon computer-executable instruction for executing a method with one or more processors in accordance with any of the methods recited in EEEs 1-21.

The invention claimed is:

1. A method comprising:
receiving an input image of a first bit depth in an input domain from an input video signal of the first bit depth, the first bit depth being higher than a second bit depth in a reshaping domain;
performing forward reshaping operations on the input image to generate a forward reshaped image of the second bit depth in the reshaping domain, the forward reshaping operations including wrapping input codewords in the input image along a non-wrapped axis of the input domain into reshaped codewords in the forward reshaped image in a wrapped axis of the reshaping domain, wherein the non-wrapped axis is represented as a straight line axis in the input domain; wherein the wrapped axis is represented in a non-straight-line spatial shape in the reshaped domain;
encoding, into an output video signal of the second bit depth, an image container containing image data derived from the forward reshaped image, the image data in the image container causing a recipient device of the output video signal to construct a backward reshaped image of a third bit depth for rendering on a display device, the third bit depth being higher than the second bit depth.

2. The method of claim 1, wherein the reshaping domain is a wrapped reshaping domain and wherein the wrapped axis refers to an axis in the wrapped reshaping domain mapped from the non-wrapped axis through one or more wrapping transformations, wherein the one or more wrapping transformations are one or more geometric transforms.

3. The method of claim 1, wherein the non-wrapped axis refers to a single channel or dimension or a combination of multiple channels or dimensions in the input image in the input domain.

4. The method of claim 1, wherein the wrapped axis of the reshaping domain has a geometric shape different from the non-wrapped axis; wherein a total number of available codewords on the wrapped axis is more than a total number of available codewords on the non-wrapped axis.

5. The method of claim 1, further comprising:
applying a forward truncated field transform to the forward reshaped image to generate an intermediate image in a truncated field domain, wherein the forward truncated field transform ensures that codewords stay in a designated codeword value range;
performing one or more image processing operations on the intermediate image to generate a processed intermediate image;
applying an inverse truncated field transform to the processed intermediate image to generate the image data in the image container.

6. The method of claim 5, wherein the processed intermediate image includes one or more clipped codeword values generated from clipping operations to ensure all codeword values in the processed intermediate image to be within a target spatial shape representing the reshaping domain.

7. The method of claim 1, wherein the second bit depth represents one of: 8 bits, 10 bits, 12 bits or another number of bits lower than the first bit depth.

8. The method of claim 1, wherein the forward reshaping operations are based on a set of forward reshaping mappings; wherein a set of operational parameter values used in the set of forward reshaping mappings is selected, based at least in part on input codewords in the input image, from among a plurality of sets of operational parameter values; wherein each set of operational parameters in the plurality of sets of operational parameter values is optimized to minimize predictions errors for a respective training image cluster among a plurality of training image clusters.

9. The method of claim 8, wherein the set of forward reshaping mappings includes one or more of: multivariate multiple regression (MMR) mappings, tensor product B-spline (TPB) mappings, forward reshaping lookup tables (FLUTs), or other types of forward reshaping mappings.

10. The method of claim 8, wherein each set of operational parameters in the plurality of sets of operational parameter values is generated based on a backward error subtraction for signal adjustment (BESA) algorithm.

11. The method of claim 10, wherein prediction errors propagated in the BESA algorithm are computed based at least in part on (a) differences between input values and reconstructed values and (b) spatial gradients derived as partial derivatives of a cross-channel forward reshaping function used for generating the reconstructed values.

12. The method of claim 1, wherein input codewords in the input image are scaled with one or more scaling factors; wherein the one or more scaling factors are optimized at runtime using a search algorithm based on one or more of: a Golden section algorithm, a Nelder-Mead algorithm, or another search algorithm.

13. The method of claim 1, wherein an input reshape representing the input domain is mapped, using a set of mapping functions, to a target reference shape representing the reshaping domain; wherein the target reference shape is selected, based at least in part on a distribution of input codewords in the input image, from among a plurality of different reference shapes corresponding to a plurality of different candidate reshaping domains.

14. The method of claim 13, wherein the plurality of different reference shapes comprises: at least one of: a complete geometric shape, a complete geometric shape inserted with a single gap portion, a complete geometric shape inserted with multiple gap portions, a donut shape, a cylinder shape, a torus shape, another shape homomorphic to a cube, or another shape non-homomorphic to a cube.

15. The method of claim 1, wherein the input domain represents one of: an RGB color space, a YCbCr color space, a perceptual quantized color space, a linear color space, or another color space.

16. The method of claim 1, wherein the first bit depth represents one of: 12 bits, 16 or more bits, or another number of bits higher than the second bit depth.

17. The method of claim 1, wherein the forward reshaping operations represent primary reshaping operations; the method further comprising: performing secondary reshaping operations on the input image to linearly scale a limited input data range to a full data range for each color channel, wherein the secondary reshaping operations include one or more of: per-channel pre-reshaping or scaling.

18. The method of claim 17, wherein image metadata is generated based on operational parameters used in the primary reshaping operations and the secondary reshaping operations; wherein the image metadata is provided in the output video signal of the second bit depth to the recipient device.

19. The method of claim 17, wherein the secondary reshaping operations are performed in a first stage preceding a second stage in which the primary reshaping operations are performed.

20. The method of claim 17, wherein a combination of the secondary reshaping operations and the primary reshaping operations is performed at runtime in a single combined stage.

21. The method of claim 1, wherein the reshaping domain is represented by a torus shape or a cylinder shape.

22. A method comprising:
  decoding, from a video signal, an image container containing image data derived from a forward reshaped image in a reshaping domain, a source image of a first bit depth in a source domain having been forward reshaped to generate the forward reshaped image in a second bit depth lower than the first bit depth;
  applying backward reshaping operations on the image data decoded from the video signal to generate a backward reshaped image in a target domain, the backward reshaped image being of a third bit depth higher than the second bit depth, the backward reshaping operations including unwrapping codewords in the image data along a wrapped axis of the reshaping domain into backward reshaped codewords in the backward reshaped image in a non-wrapped axis of the target domain, wherein the non-wrapped axis is represented as a straight line in the target domain; wherein the wrapped axis is represented a spatial shape different from the straight line in the reshaped domain;
  rendering, on a display device, a display image generated from the backward reshaped image.

23. An apparatus comprising a processor and configured to perform the method recited in claim 1.

24. A non-transitory computer-readable storage medium having stored thereon computer-executable instructions for executing a method with one or more processors in accordance with the method of claim 1.

* * * * *